United States Patent
Trpkovski

(10) Patent No.: US 6,962,476 B2
(45) Date of Patent: Nov. 8, 2005

(54) METHODS AND APPARATUS FOR HANDLING FRAGILE BARS

(75) Inventor: Paul Trpkovski, Loganville, WI (US)

(73) Assignee: Cardinal IG Company, Eden Prairie, MN (US)

(*) Notice: Subject to any disclaimer, the term of this patent is extended or adjusted under 35 U.S.C. 154(b) by 174 days.

(21) Appl. No.: 10/347,500

(22) Filed: Jan. 15, 2003

(65) Prior Publication Data

US 2003/0190227 A1 Oct. 9, 2003

Related U.S. Application Data

(63) Continuation-in-part of application No. 10/050,742, filed on Jan. 15, 2002, now Pat. No. 6,591,988.

(51) Int. Cl.[7] .............................................. B66F 11/00
(52) U.S. Cl. ..................................................... 414/745.1
(58) Field of Search ........................... 211/70.4; 294/92; 414/273, 608, 745.1, 792.9, 793.2

(56) References Cited

U.S. PATENT DOCUMENTS

| | | | |
|---|---|---|---|
| 2,459,627 A | | 1/1949 | Cox |
| 3,028,186 A | | 4/1962 | Skubic |
| 3,154,338 A | * | 10/1964 | Leach .......................... 294/88 |
| 3,157,424 A | | 11/1964 | Hall |
| 3,173,556 A | | 3/1965 | Gaudriot et al. |
| 3,503,519 A | | 3/1970 | Jay |
| 3,537,599 A | | 11/1970 | Jay |
| 3,680,904 A | * | 8/1972 | Adie .......................... 294/19.1 |
| 3,800,980 A | | 4/1974 | Takeuchi et al. |
| 3,870,165 A | | 3/1975 | Besijn |
| 3,876,489 A | | 4/1975 | Chenel |
| 4,000,818 A | | 1/1977 | Schmid et al. |
| 4,033,597 A | | 7/1977 | Boyer |
| 4,045,071 A | | 8/1977 | Dunstan |
| 4,083,251 A | | 4/1978 | Förster .......................... 73/738 |
| 4,252,486 A | | 2/1981 | Soligno |
| 4,368,822 A | | 1/1983 | Kramer et al. |
| 4,439,091 A | * | 3/1984 | Frias .......................... 414/22.59 |
| 4,465,313 A | | 8/1984 | Val |
| 4,495,023 A | | 1/1985 | Lisec |
| 4,574,553 A | | 3/1986 | Lisec |
| 4,576,481 A | | 3/1986 | Hansen |
| 4,708,566 A | | 11/1987 | Stolzer et al. |
| 4,743,336 A | | 5/1988 | White |
| 4,769,105 A | | 9/1988 | Lisec |
| 4,820,101 A | | 4/1989 | Fenn |
| 4,836,005 A | | 6/1989 | Lisec |
| 4,885,926 A | | 12/1989 | Lisec |
| 4,886,410 A | | 12/1989 | Lisec |
| 4,902,213 A | | 2/1990 | Lisec |
| 4,949,666 A | | 8/1990 | Lisec |
| 4,961,816 A | | 10/1990 | Lisec |
| 5,117,669 A | | 6/1992 | Lisec |
| 5,147,176 A | | 9/1992 | Stolzer et al. |

(Continued)

FOREIGN PATENT DOCUMENTS

| | | |
|---|---|---|
| EP | 0 288 426 A2 | 10/1988 |
| WO | WO 00/43235 | 7/2000 |

*Primary Examiner*—Richard Ridley
(74) *Attorney, Agent, or Firm*—Fredrikson & Byron, P.A.

(57) ABSTRACT

Methods and apparatus for handling material for the insulating glass industry are disclosed. One method of handling material for the insulating glass industry in accordance with the present invention includes the step of arranging a plurality of bars into a plurality of stacks with adjacent stacks defining spaces dimensioned to receive a bar engaging member. The stacks of bars may then be transported to a desired destination. A bar engaging member may be inserted into a space defined by the stacks, and one or more bars may be grasped using the bar engaging member. A container for handling material for the insulating glass industry is also disclosed. The container may advantageously include a plurality of prearranged bar locating members configured to hold a predetermined type of bar stock.

25 Claims, 19 Drawing Sheets

U.S. PATENT DOCUMENTS

| | | | |
|---|---|---|---|
| 5,161,401 A | 11/1992 | Lisec | |
| 5,181,412 A | 1/1993 | Lisec | |
| 5,243,844 A | 9/1993 | Lisec | |
| 5,377,473 A | 1/1995 | Narayan et al. | |
| 5,395,200 A | 3/1995 | Meier | |
| 5,439,716 A | 8/1995 | Larsen | |
| 5,465,883 A | 11/1995 | Woodward | |
| 5,514,432 A | 5/1996 | Lisec | |
| 5,641,076 A | 6/1997 | Englund | |
| 5,679,419 A | 10/1997 | Larsen | |
| 5,705,010 A | 1/1998 | Larsen | |
| 5,714,214 A | 2/1998 | Larsen | |
| 5,769,105 A | 6/1998 | Margol et al. | |
| 5,794,481 A | 8/1998 | Lisec | 72/307 |
| 5,816,774 A | 10/1998 | Stolzer et al. | |
| 5,850,924 A | 12/1998 | Borter | |
| 5,884,778 A | 3/1999 | Freiheit | |
| 5,938,047 A | 8/1999 | Ellis et al. | |
| 6,102,206 A | 8/2000 | Pride | 206/454 |
| 6,164,883 A | 12/2000 | Wilcox | 410/36 |
| 6,197,231 B1 | 3/2001 | Lisec | |
| 6,202,863 B1 | 3/2001 | Grenier | 211/704 |
| 6,457,619 B1 | 10/2002 | Werner et al. | 224/405 |
| 5,161,401 A | 11/1992 | Lisec | |
| 5,181,412 A | 1/1993 | Lisec | |
| 5,243,844 A | 9/1993 | Lisec | |
| 5,377,473 A | 1/1995 | Narayan et al. | |
| 5,395,200 A | 3/1995 | Meier | |
| 5,439,716 A | 8/1995 | Larsen | |
| 5,465,883 A | 11/1995 | Woodward | |
| 5,514,432 A | 5/1996 | Lisec | |
| 5,641,076 A | 6/1997 | Englund | |
| 5,679,419 A | 10/1997 | Larsen | |
| 5,705,010 A | 1/1998 | Larsen | |
| 5,714,214 A | 2/1998 | Larsen | |
| 5,769,105 A | 6/1998 | Margol et al. | |
| 5,794,481 A | 8/1998 | Lisec | 72/307 |
| 5,816,774 A | 10/1998 | Stolzer et al. | |
| 5,850,924 A | 12/1998 | Borter | |
| 5,884,778 A | 3/1999 | Freiheit | |
| 5,938,047 A | 8/1999 | Ellis et al. | |
| 6,102,206 A | 8/2000 | Pride | 206/454 |
| 6,164,883 A | 12/2000 | Wilcox | 410/36 |
| 6,197,231 B1 | 3/2001 | Lisec | |
| 6,202,863 B1 | 3/2001 | Grenier | 211/704 |
| 6,457,619 B1 | 10/2002 | Werner et al. | 224/405 |

\* cited by examiner

METHODS AND APPARATUS FOR HANDLING FRAGILE BARS

RELATED APPLICATIONS

This application is a Continuation in Part (CIP) of U.S. patent application Ser. No. 10/050,742 by Trpkovski filed on Jan. 15, 2002, now U.S. Pat. No. 6,591,988, the entire disclosure of which is hereby incorporated by reference.

FIELD OF THE INVENTION

The present invention relates generally to methods and apparatus for handling material for the insulating glass industry. More particularly, the present invention relates to methods and apparatus for handling elongate barstock that is useful for forming components such as, for example, spacer frames and muntin bar lattices.

BACKGROUND OF THE INVENTION

Today, insulating glass units have achieved widespread use as building components. In order to produce insulating glass units inexpensively and in high volume, modern manufacturing of insulating glass units is often mechanized and/or automated. Various materials may be used to manufacture insulating glass units, including sheets of glass, spacer frames, and various sealants. Insulating glass units may also include muntin bars. Muntin bars may be used for both functional and decorative purposes with glass windows or doors. The muntin bars are particularly useful when they retain their geometric configuration and do not separate, as well as when they are able to remain in a flat mating surface relation with the glass.

SUMMARY OF THE INVENTION

The present invention relates generally to methods and apparatus for handling material for the insulating glass industry. More particularly, the present invention relates to methods and apparatus for handling elongate barstock that is useful for forming components such as, for example, spacer frames and muntin bar lattices. One method of handling material for the insulating glass industry in accordance with the present invention includes the step of arranging a plurality of bars into a plurality of stacks with adjacent stacks defining spaces dimensioned to receive a bar engaging member. The stacks of bars may then be transported to a desired destination. A bar engaging member may be inserted into a space defined by the stacks, and one or more bars may be grasped using the bar engaging member. In some implementations of the invention, the step of grasping one or more bars using the first bar engaging member includes the steps of inserting a second bar engaging member into a second space defined by the stacks and trapping one or more bars between the bar engaging member and the second bar engaging member.

A container for handling material for the insulating glass industry is also disclosed. In some implementations, the container includes a container frame and a plurality of combs selectively fixed to the frame. In one aspect of the present invention, each comb includes a plurality of tines that are spaced to define a plurality of channels dimensioned to accept bars having a predetermined width. In another aspect of the present invention, the tines are dimensioned to create spaces between adjacent channels, with each space being dimensioned to receive a bar engaging member. In some implementations, each tine comprises a shaft and a sleeve disposed over the shaft. The sleeve may advantageously comprise a no-mar material.

In some implementations, the present invention includes a container having a frame and a plurality of combs that are selectively fixed to the frame by a coupling mechanism. In some implementations, the coupling mechanism comprises a plunger fixed to the frame of the container and a detent defined by a base of the comb. The detent may be advantageously dimensioned to accept at least a portion of the plunger. The plunger may comprise, for example, a ball and a spring arranged to bias the ball toward the detent.

In certain advantageous implementations, the present invention utilizes a container including a first forklift interface and a second forklift interface. In some implantations, each forklift interface comprises a first receptacle and a second receptacle. Each receptacle may comprise, for example, a lumen defined by a tube. In some advantageous implementations, each forklift interface comprises a first tube positioned on a first side of a centroid of the container and a second tube disposed on a second side of the centroid of the container. When this is the case, the first tube and the second tube may be advantageously positioned substantially equidistantly from the centroid of the container.

A method of handling a first type of bars having a first dimension and a second type of bars having a second dimension is also disclosed. In some implementations, this method includes the step of providing a container including a frame and a first set of combs selectively fixed to the frame. Each comb in the first set of combs preferably has a plurality of tines spaced to accept bars having the first dimension. The first set of combs may be removed from the container and a second set of combs may be selectively fixed to the frame of the container. In certain implementations, each comb in the second set of combs advantageously has a plurality of tines spaced to accept bars having the second dimension.

Another method in accordance with the present invention may include the following steps:

1) Providing a container having a plurality of prearranged muntin bar retaining channels configured to hold a predetermined type of bars.
2) Placing a plurality of bars in the retaining channels of the container.
3) Placing a plurality of containers in a transportation vehicle. In some applications, the containers may be stacked in a semi trailer.
4) Removing the containers from the transportation vehicle.
5) Delivering at least one container to an arrival bay arranged to receive a container.
6) Sequentially removing bars from the container one at a time.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
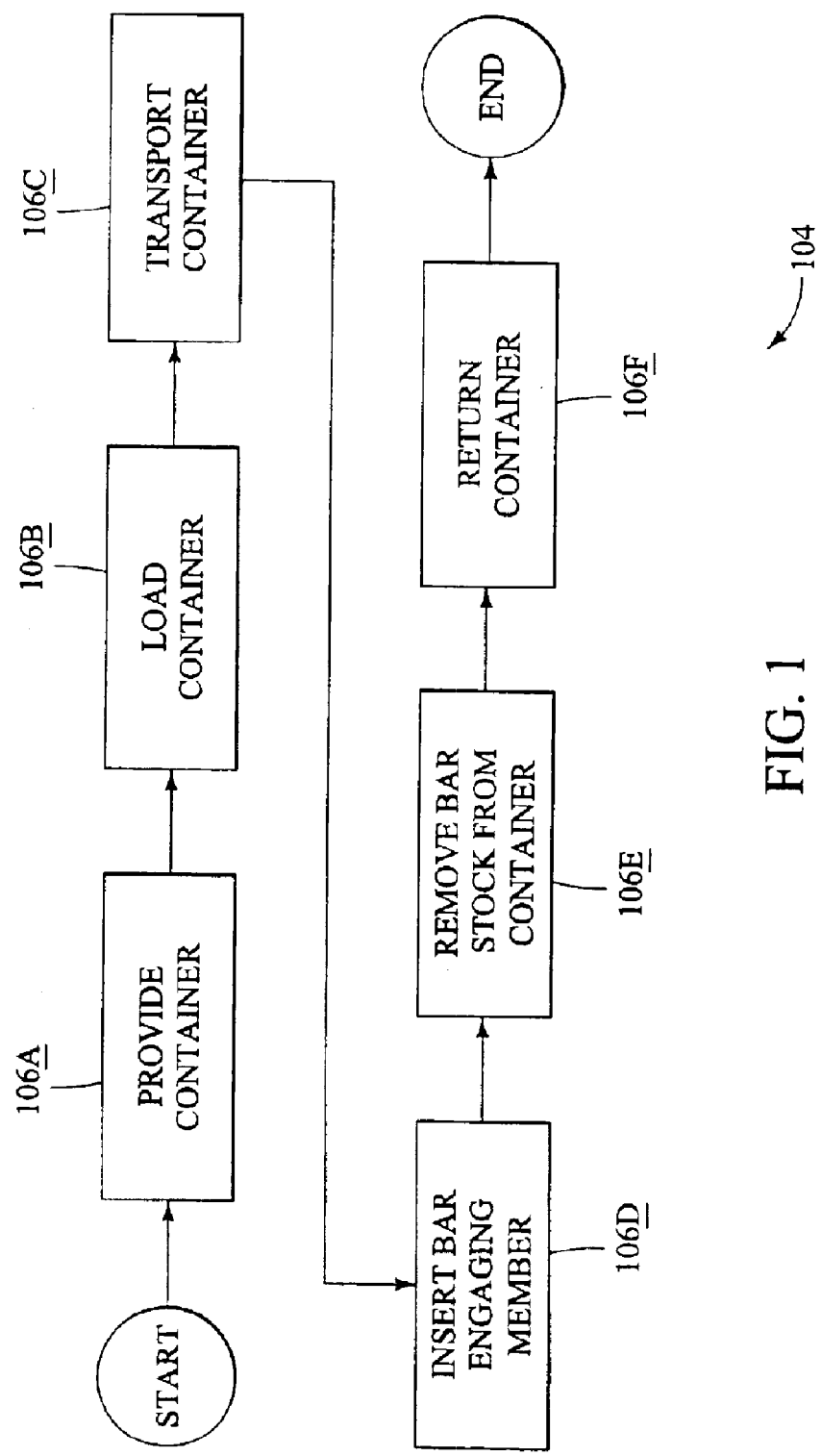
FIG. 1 is a flow chart illustrating a method of handling material for the insulating glass industry.

FIG. 1 is a flow chart 104 illustrating a method of handling material for the insulating glass industry. The material being handled may comprise, for example, bar stock useful in the insulating glass industry. Various types of bar stock may be used without deviating from the spirit and scope of the present invention. For example, bar stock suitable for forming spacer frames useful in the insulating glass industry may be used. By way of a second example, bar stock suitable for forming muntin bar lattices may also be used.

Bar stock used in the insulating glass industry often comprises thin sheet metal (e.g., 4.5 mil stainless steel, 6.0 mil aluminum, and the like). This thin sheet metal can be easily damaged during handling. For example, the bar stock may be scratched, bent and/or dented. Some types of bar stock may include a finish such as, for example, paint. This finish may be particularly susceptible to scratching.

Block 106A of flow chart 104 comprises the step of providing a container. The container may be provided, for example, proximate a source of bar stock. This source of bar stock may be, for example, a factory where bar stock is fabricated. In a preferred method in accordance with the present invention, the container includes a plurality of prearranged bar locating members configured to hold a predetermined type of bar stock. In some methods in accordance with the present, the container is provided at a location where bar stock is being fabricated and the bar stock is placed in the container soon after being fabricated. Placing the bar stock in the contained soon after it is fabricated reduces the likelihood that the bar stock will be damaged.

In one exemplary embodiment, the bar locating members comprise tines which include a no-mar sleeve. The no-mar sleeve may reduce the likelihood that the outer surface of the bar stock is scratched during handling.

Block 106B of flow chart 104 comprises the step of loading the container. The step of loading the container may involve placing a plurality of bars between the bar locating members of the container. This step may also involve arranging a plurality of bars into a plurality of stacks with adjacent stacks defining spaces dimensioned to receive a bar engaging member.

Block 106C of flow chart 104 comprises the step of transporting the container. The step of transporting the container may involve placing a plurality of containers in a transportation vehicle. In some applications, the containers may be arranged in an interlocking fashion in the vehicle. The step of transporting the container may also involve removing the plurality of containers from the transportation vehicle. The step of transporting the container may also involve delivering at least one container to an arrival bay arranged to receive the container. The container may be delivered to the arrival bay using a vehicle, for example, a fork lift.

Block 106D of flow chart 104 comprises the step of inserting a bar engaging member into a space defined by adjacent stacks of bar stock. Various bar engaging members may be utilized without deviating from the spirit and scope of the present invention. Bar engaging members suitable for some applications may comprise, for example, grippers, pinchers, fingers, and vacuum cups.

Block 106E of flow chart 104 comprises the step of removing bar stock from the container. In some methods in accordance with the present invention, bar stock is removed one piece at a time. In other methods in accordance with the present invention, a plurality of pieces of bar stock are grasped and removed from the container.

Block 106F comprises the step of returning the container. The container may be returned, for example, to the bar stock source. At the bar stock source, the container may by reloaded by placing a plurality of bars between the bar locating members of the container.

Figure 2:
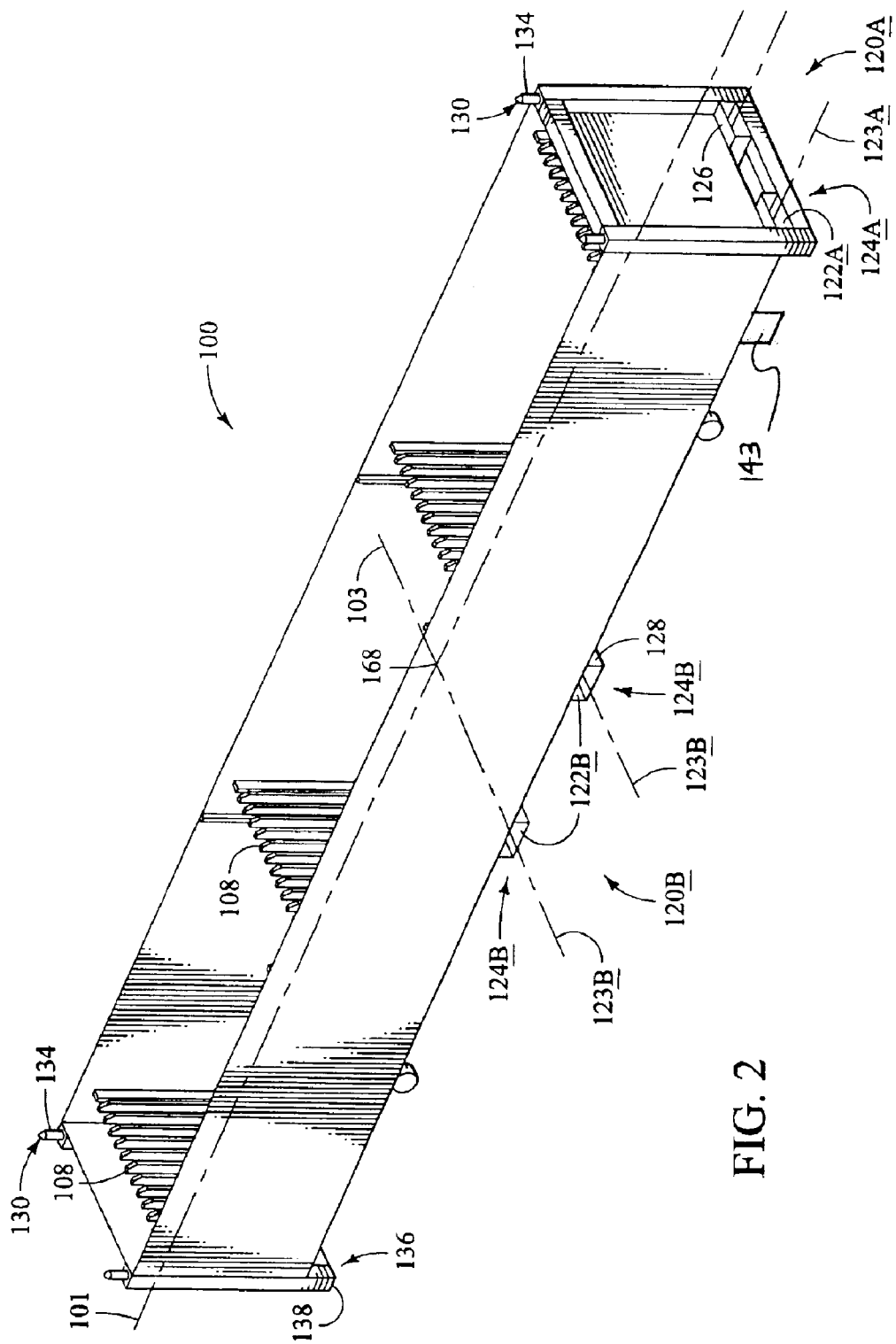
FIG. 2 is a perspective view of a container in accordance with the present invention.

FIG. 2 is a perspective view of a container 100 in accordance with the present invention. Container 100 of FIG. 2 includes a plurality of pre-arranged bar locating members 108 dimensioned and spaced for holding and dispensing a desired type of bar stock. Container 100 of FIG. 2 also includes a first forklift interface 120A and a second fork lift interface 120B. First forklift interface 120A comprises a plurality of receptacles 124A that are preferably dimensioned to receive the forks of a forklift. In the embodiment of FIG. 2, each receptacle 124A comprises a lumen 122A defined by a beam 126. Second forklift interface 120B comprises a plurality of receptacles 124B that are also preferably dimensioned to receive the forks of a forklift. In the embodiment of FIG. 2, each receptacle 124B comprises a lumen 122B defined by a cross member 128. As shown in FIG. 2, each lumen 122A has a central axis 123A and each lumen 122B has a central axis 123B. In a preferred embodiment, the forks of a fork lift may be inserted into either end of lumens 122A, 122B.

Container 100 has longitudinal axis 101 and a lateral axis 103 that intersect at a centroid 168 of container 100. In the embodiment of FIG. 2, beams 126 and cross members 128 both comprise lengths of tubing having a generally rectangular cross section. In FIG. 2, it may be appreciated that each forklift interface comprises a first tube positioned on a first side of centroid 168 of container 100 and a second tube disposed on a second side of centroid 168 of container 100. In the embodiment of FIG. 2, the first tube and the second tube of each forklift interface are positioned substantially equidistantly from centroid 168 of container 100.

In FIG. 2 it may be appreciated that first forklift interface 120A and a second fork lift interface 120B are disposed at an angle relative to one another. In the embodiment of FIG. 2, each cross member 128 is arranged at about a 90 degree angle relative to each beam 126.

In FIG. 2, it may be appreciated that container 100 includes a plurality of first mating elements 130 and second mating elements 132. In the embodiment of FIG. 2 each first mating element 130 comprises a post 134 and each second mating element 136 comprises a socket 138. In some embodiments of the present invention, sockets 140 are dimensioned and located to accept the posts 142 of a second substantially similar container. Also in some embodiments of the present invention, sockets 140 are dimensioned and located to receive the alignment posts of workstation for locating container 100 in the workstation. Container 100 of FIG. 2 also includes a sensor target 143 that is selectively coupled to container 100. In FIG. 2, it may be appreciated that sensor target 143 has an offset location relative longitudinal axis 101 and a lateral axis 103. Some methods in accordance with the present invention include the step of sensing the presence of sensor target 143 to verify that container 100 is properly oriented within the workstation.

Figure 3:
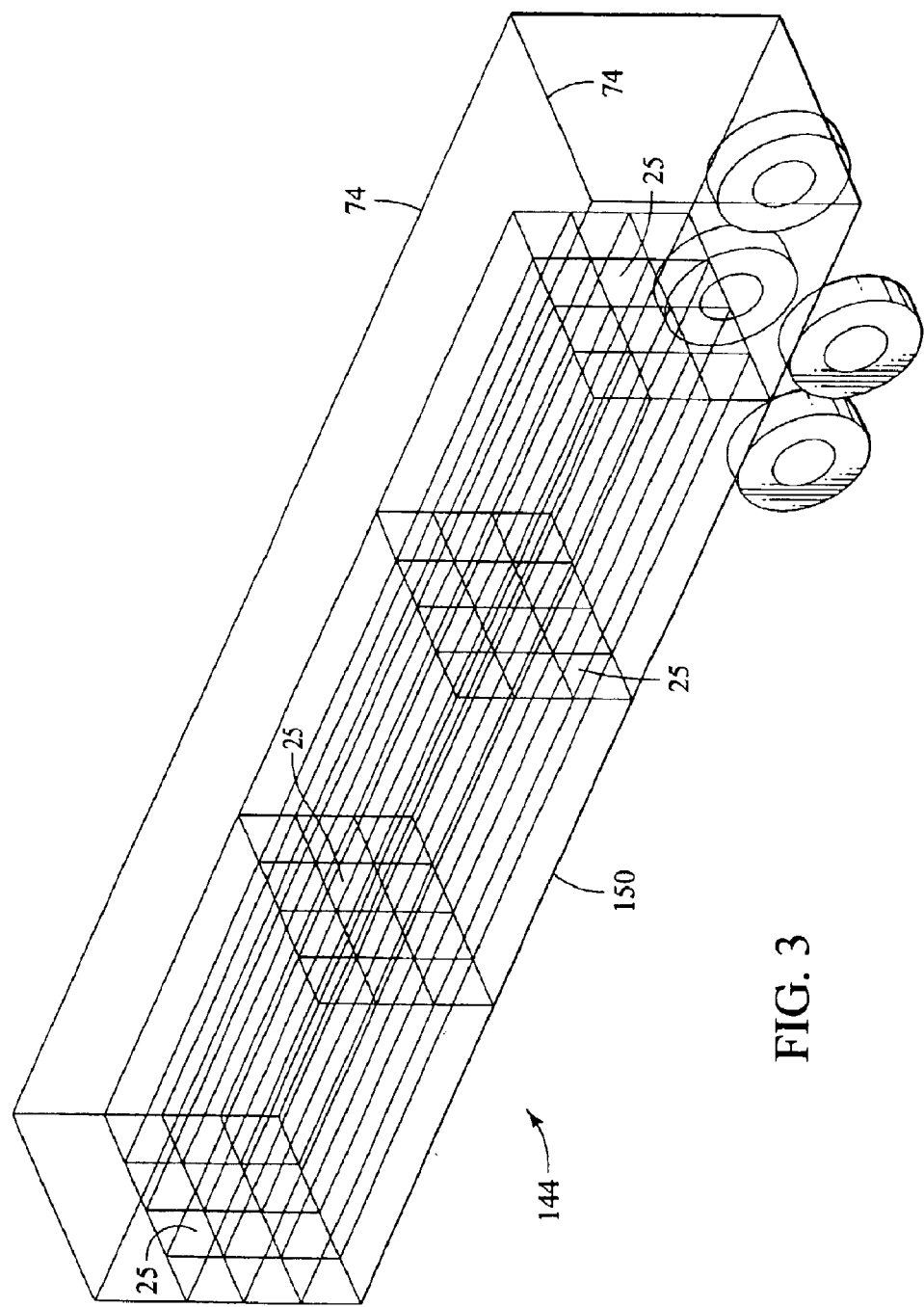
FIG. 3 is a perspective view of an assembly including a vehicle and a plurality of containers that are disposed within the walls of vehicle.

FIG. 3 is a perspective view of an assembly including a vehicle 144 and a plurality of containers 25 that are disposed within the walls 74 of vehicle 144. In some methods in accordance with the present invention, a plurality of containers 25 are mated with one another in an interlocking stacked configuration. In the embodiment of FIG. 3, vehicle 144 comprises a semitrailer 150. It is to be appreciated that a container may be transported using various vehicles without deviating from the spirit and scope of the present invention. Examples of vehicles which may be suitable in some applications include trucks, airplanes, ships, trains, and fork lifts.

Figure 4:
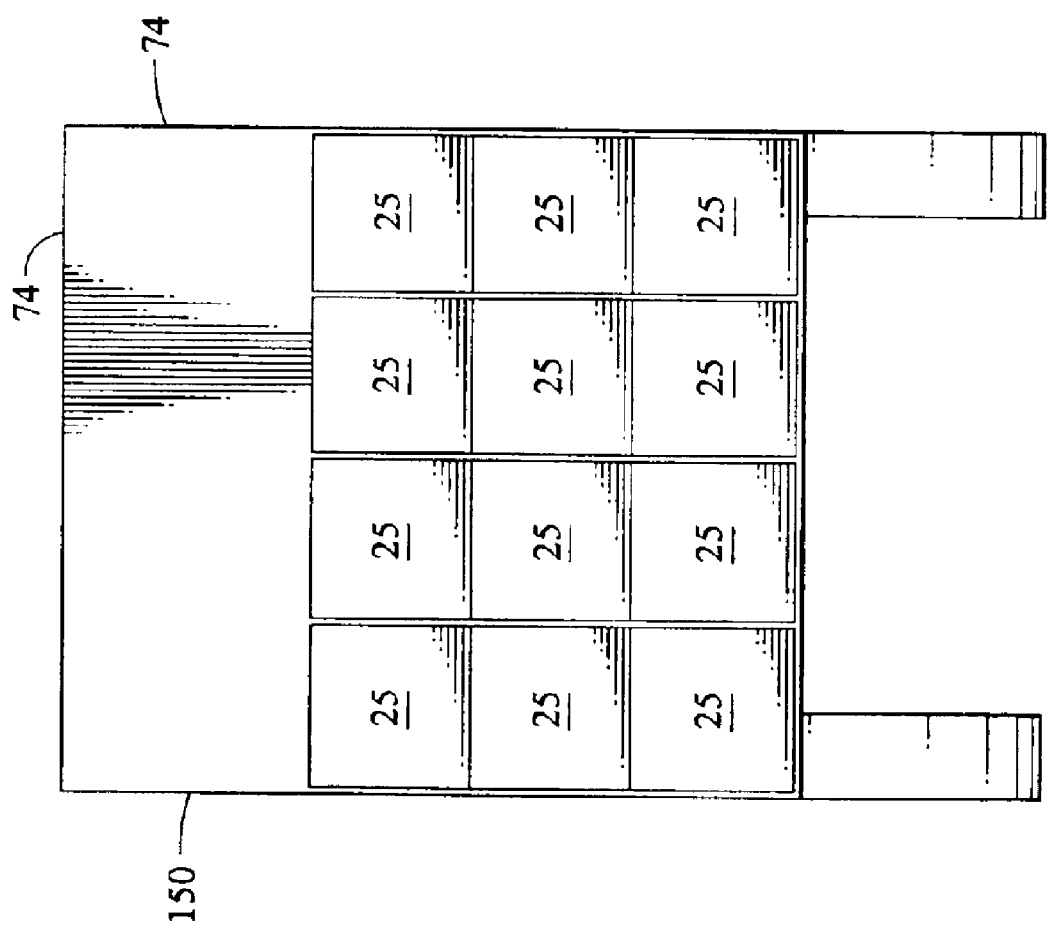
FIG. 4 is a plan view of an assembly including a semi-trailer and a plurality of containers located within a plurality of walls of semitrailer.

FIG. 4 is a plan view of an assembly including a semitrailer 150 and a plurality of containers 25 located within a plurality of walls 74 of semitrailer 150.

Figure 5:
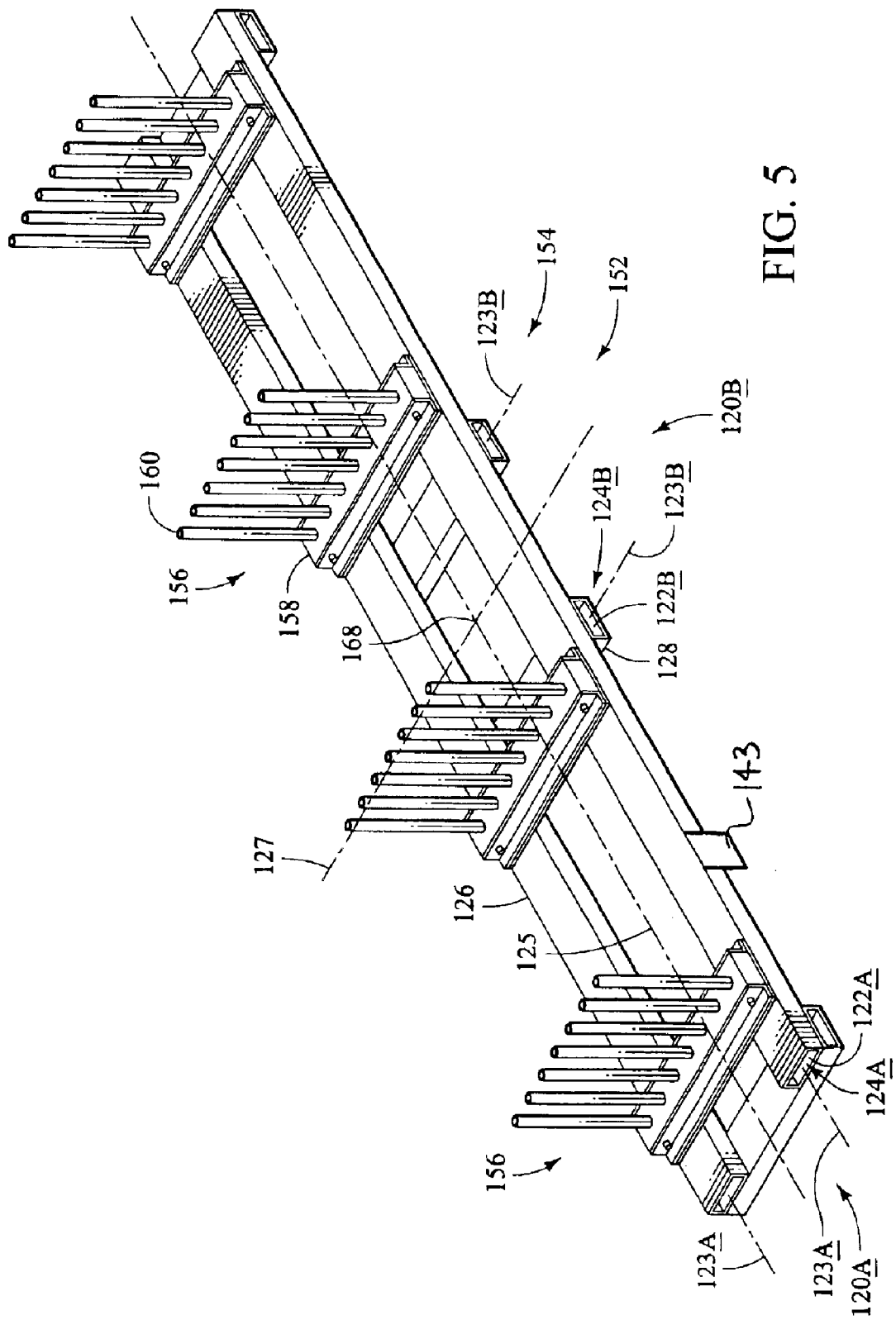
FIG. 5 is a perspective view of a frame assembly in accordance with an exemplary embodiment of the present invention.

FIG. 5 is a perspective view of a frame assembly 152 in accordance with an exemplary embodiment of the present invention. Frame assembly 152 includes a frame 154 and a plurality of combs 156 that are selectively coupled to frame 154. Each comb 156 of frame assembly 152 comprises a base 158 and a plurality of tines 160 extending away from the base 158. Frame 154 of frame assembly 152 includes a plurality of beams 126 and a plurality of cross members 128 fixed to beams 126, for example by welding.

First forklift interface 120A comprises a plurality of receptacles 124A that are preferably dimensioned to receive the forks of a forklift. In the embodiment of FIG. 2, each receptacle 124A comprises a lumen 122A defined by a beam 126. Second forklift interface 120B comprises a plurality of receptacles 124B that are also preferably dimensioned to receive the forks of a forklift. In the embodiment of FIG. 2, each receptacle 124B comprises a lumen 122B defined by a cross member 128. As shown in FIG. 2, each lumen 122A has a central axis 123A and each lumen 122B has a central axis 123B. In a preferred embodiment, the forks of a fork lift may be inserted into either end of lumens 122A, 122B.

Frame 154 has longitudinal axis 125 and a lateral axis 127 that intersect at a centroid 168 of frame 154. In the embodiment of FIG. 5, beams 126 and cross members 128 both comprise lengths of tubing having a generally rectangular cross section. In FIG. 5, it may be appreciated that each forklift interface comprises a first tube positioned on a first side of a centroid of the container and a second tube disposed on a second side of the centroid of the container. In the embodiment of FIG. 5, the first tube and the second tube of each forklift interface are positioned substantially equidistantly from the centroid of the container. In FIG. 5 it may be appreciated that first forklift interface 120A and a second fork lift interface 120B are generally orthogonal to one another. In the embodiment of FIG. 5, each cross member 128 is arranged at about a 90 degree angle relative to each beam 126.

Frame 154 of FIG. 5 also includes a sensor target 143 that is selectively coupled to frame 154. In FIG. 5, it may be appreciated that sensor target 143 has an offset location relative longitudinal axis 125 and a lateral axis 127 of frame 154. Some methods in accordance with the present invention include the step of sensing the presence of sensor target 143 to verify that frame 154 is properly oriented within a workstation.

Figure 6:
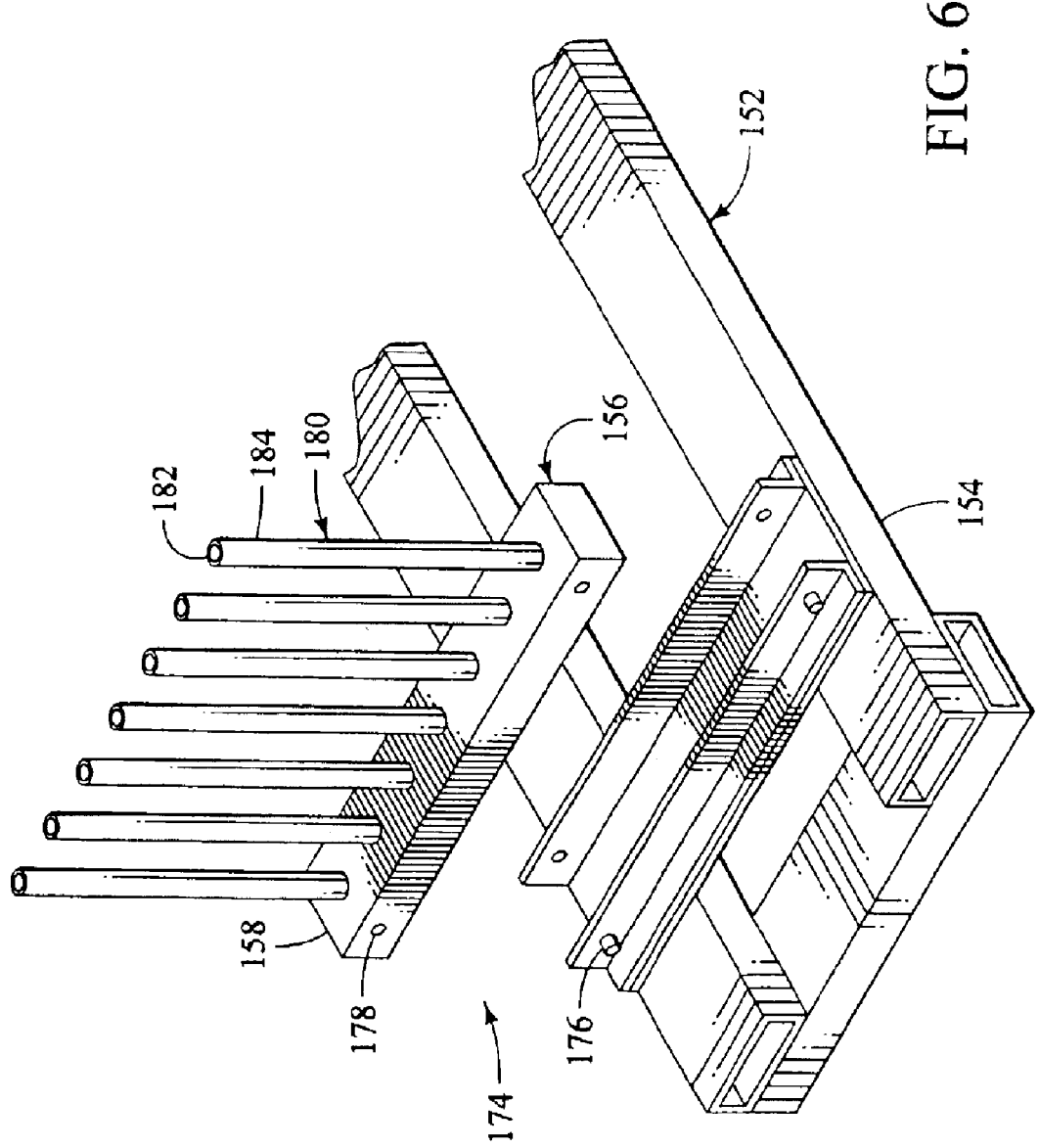
FIG. 6 is an exploded perspective view of a portion of frame assembly of FIG. 5.
Figure 7:
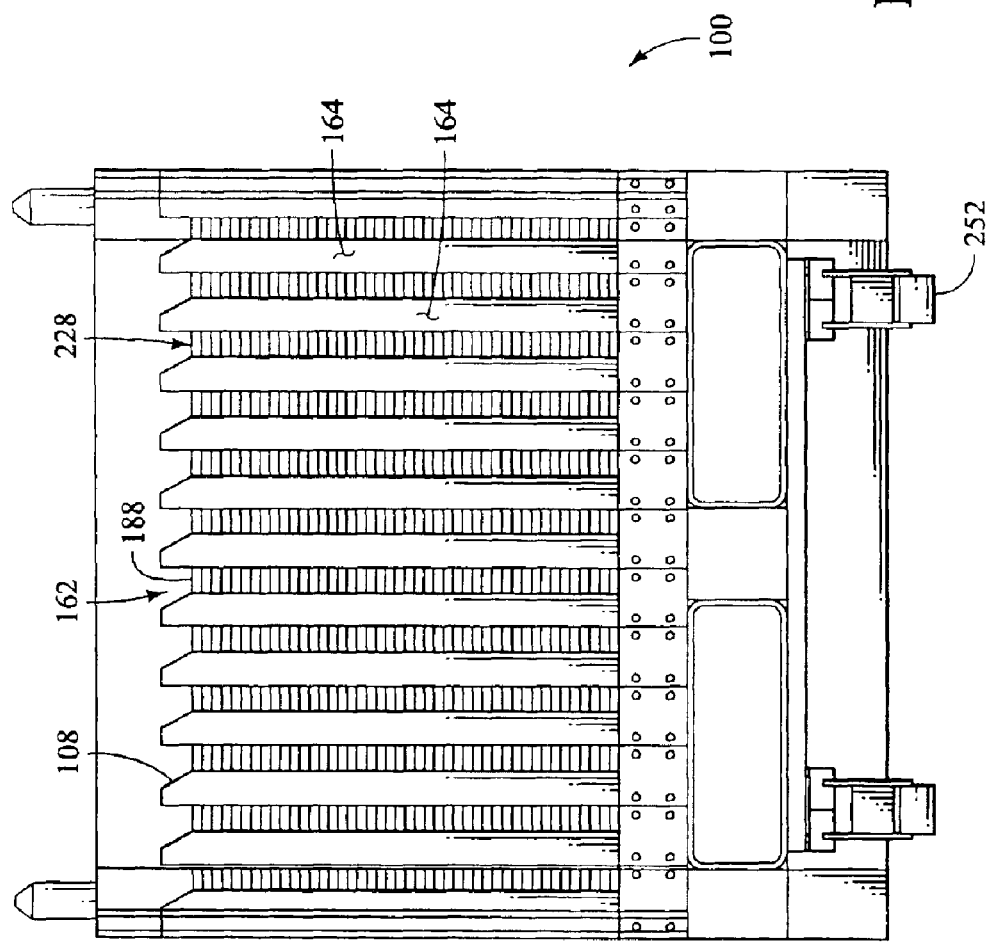
FIGS. 7 through 10 are cross sectional plan views of containers in accordance with the present invention.
Figure 8:
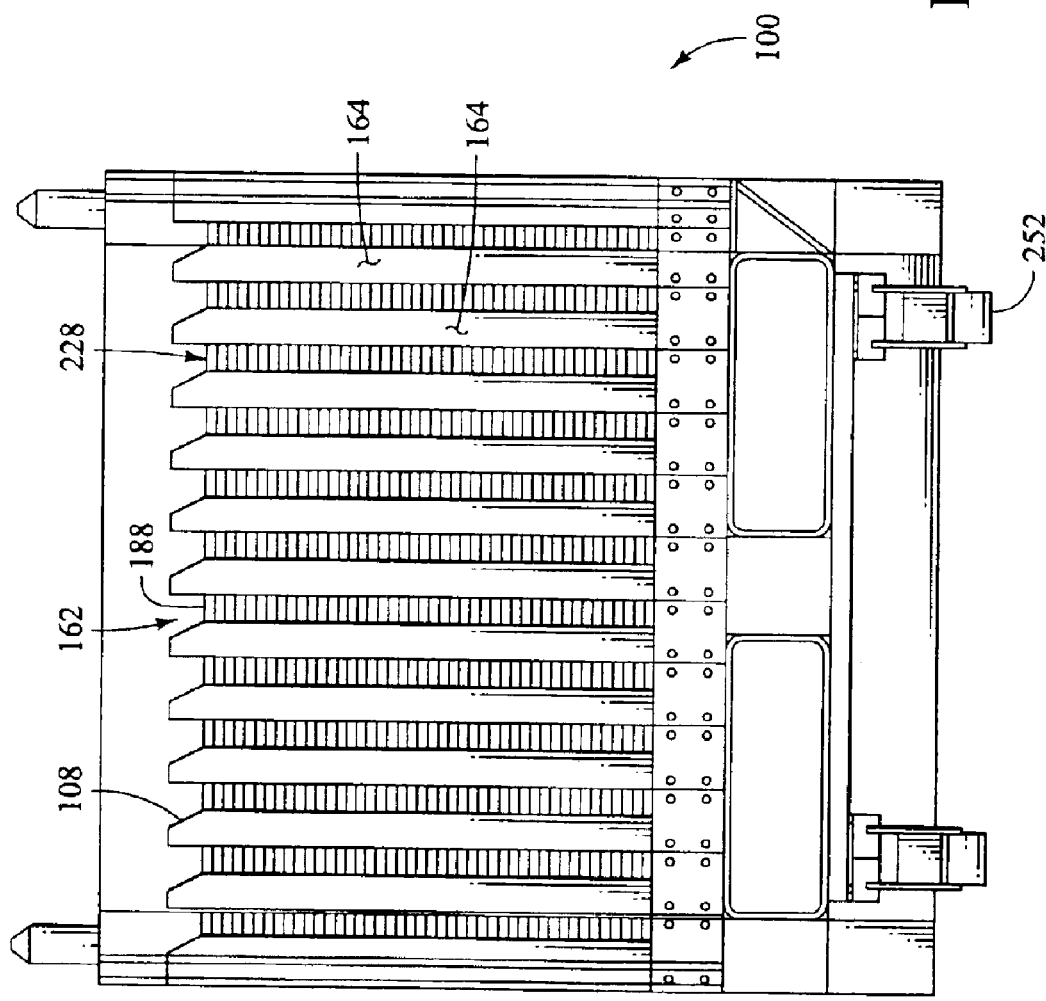
Figure 9:
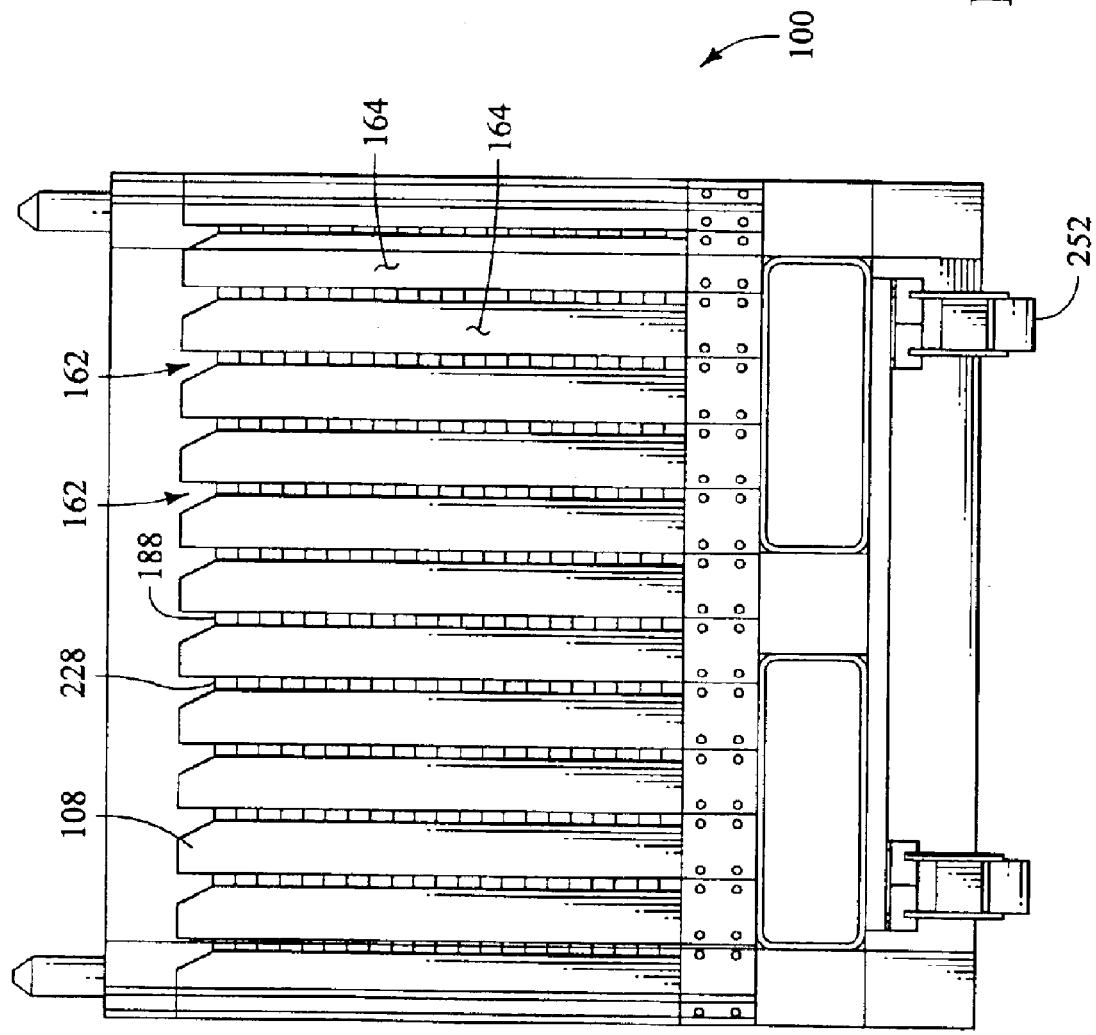
Figure 10:
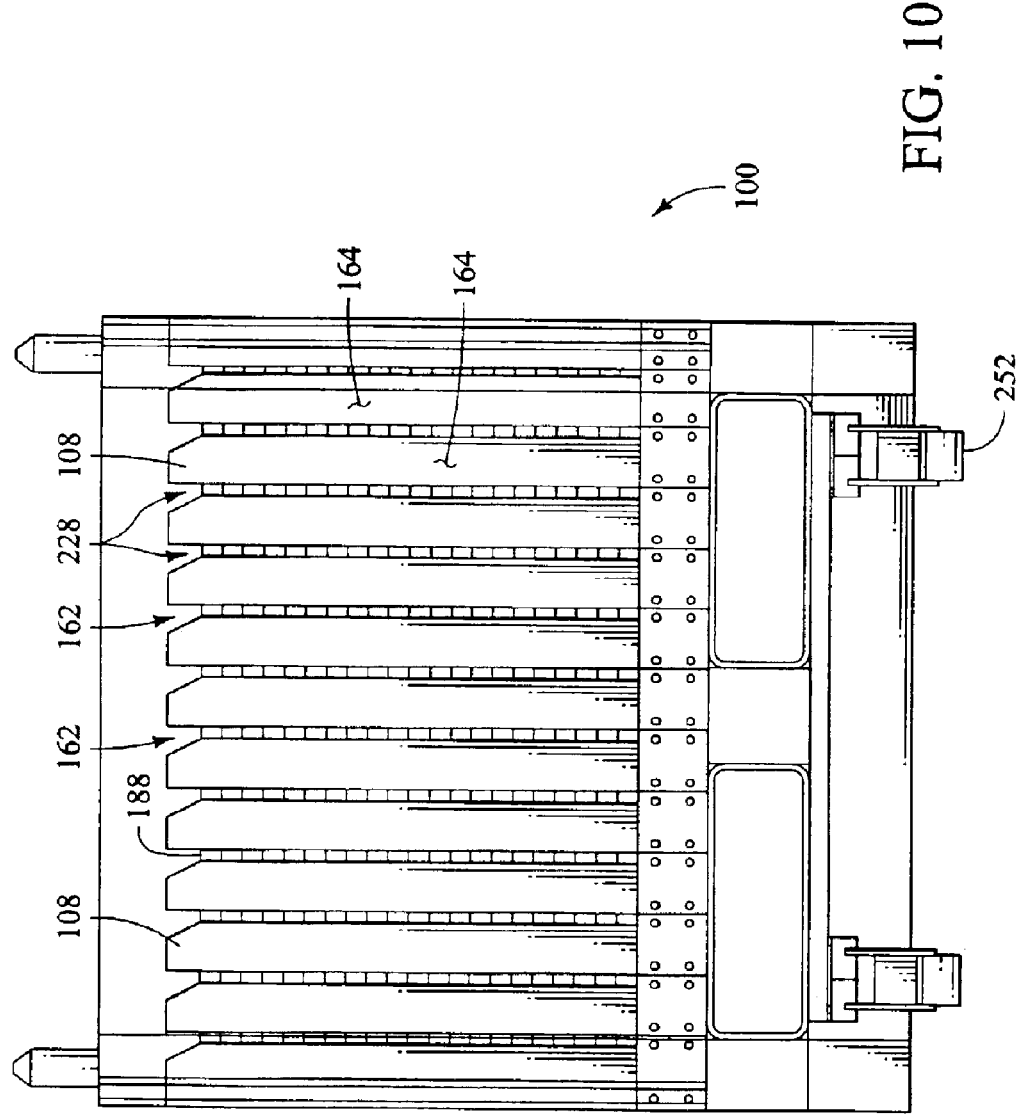

FIG. 6 is an exploded perspective view of a portion of frame assembly 152 of FIG. 5. In the embodiment of FIG. 6, one comb 156 is shown in a detached position. In some embodiments of the present invention, combs 156 are selectively coupled to frame 154 by a coupling mechanism 174. In the embodiment of FIG. 6, coupling mechanism 174 comprises a plunger 176 that is fixed to frame 154 and a detent 178 defined by base 158 of comb 156. Detent 178 is preferably dimensioned to accept at least a portion of plunger 176. Plunger 176 may comprise, for example, a ball and a spring that is arranged to bias the ball toward detent 178.

In FIG. 6, it may be appreciated that each tine 180 includes a shaft 182 and a sleeve 184 that is disposed about shaft 182. In a preferred embodiment, each sleeve 184 comprises a no-mar material that is selected to avoid damaging, marking, or causing blemishes on a bar stock material. Various no-mar materials may be used without deviating from the spirit and scope of the present invention. Examples of no-mar materials which may be suitable in some applications include polymeric materials (e.g., polyethylene and polypropylene) and elastomeric materials (e.g., polyurethane). It is to be appreciated that a container in accordance with the present invention may be configured to carry a desired type of bar stock by installing combs having tines that are dimensioned and spaced to receive the desired bar stock.

FIGS. 7 through 10 are cross sectional plan views of containers 100 in accordance with the present invention. Each container 100 includes a plurality bar locating members 108 that are preferrably dimensioned and spaced for receiving desired pre-sized bars 188. In FIGS. 7 through 10, it may be appreciated that bar locating members 108 are spaced to define a plurality of channels 162 dimensioned to accept bars having a given width. In the embodiments illustrated in FIGS. 7 through 10, a stack 228 of bars 188 is disposed within each channel 162. Also in FIGS. 7 through 10, it may be appreciated that bar locating members 108 are dimensioned to create spaces 164 between adjacent channels 162. In a preferred embodiment, each space 164 is dimensioned to receive a bar engaging member. In this preferred embodiment, each space 164 has dimensions suitable to allow access of a portion of a selection and retrieval subsystem to automatically select and retrieve bars 188 from the container, and deliver the bars to a desired location. The containers 100 illustrated in FIGS. 7 through 10 also include a plurality of casters 252. Casters 252 may facilitate movement of the containers. Containers may include, for example, casters, rollers, and wheels without deviating from the spirit and scope of the present invention.

Figure 11:
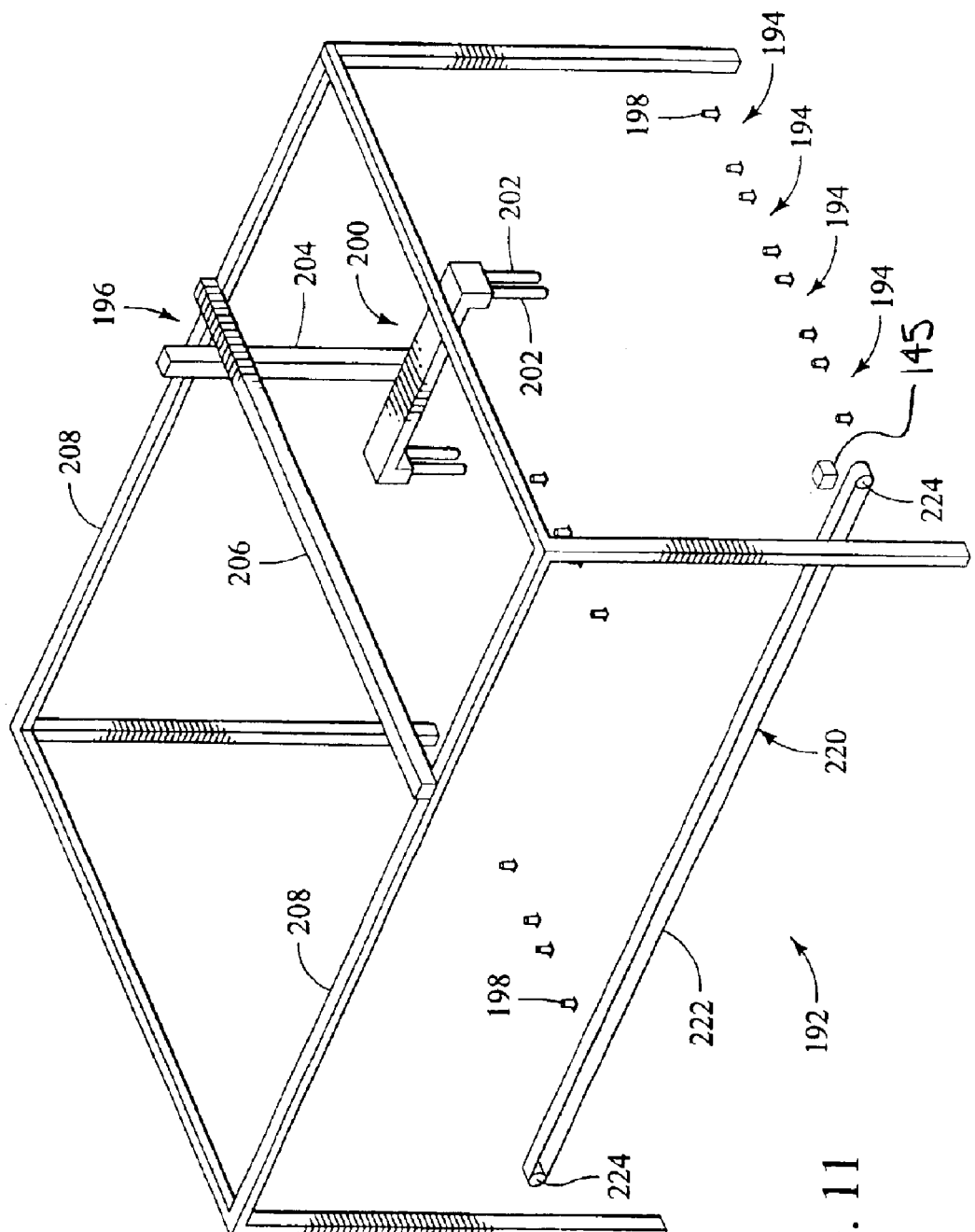
FIG. 11 is a perspective view of a system for automatically selecting and retrieving desired material from an appropriate container.

FIG. 11 is a perspective view of a system 192 for automatically selecting and retrieving desired material from an appropriate container. System 192 includes a plurality of bays 194. Each bay 194 is preferably configured to receive a container. In the embodiment of FIG. 1, each bay 194 includes a plurality of alignment pins 198. In a preferred embodiment, each bay 194 also includes a sensor 145 that is adapted to detect the presence of a sensor target 143. One sensor 145 is shown in FIG. 11. In some methods in accordance with the present invention include the sensor 145 and sensor target 143 fixed to a container may be used to verify that the container is properly oriented within a bay of system 192.

System 192 also includes a bar engaging assembly 200 that is coupled to a motion control system 196. In the embodiment of FIG. 11, bar engaging assembly 200 includes a plurality of bar engaging members 202. In some embodiments of the present invention, two or more bar engaging members 202 may be selectively urged towards one another to trap one or more bars. The force used to urge two or more bar engaging members 202 towards one another may be provided by, for example, one or more air cylinders.

In the embodiment of FIG. 1, motion control system 196 includes a z-axis linear actuator 204, an x-axis linear actuator 206 and a plurality of y-axis linear actuators 208. In a preferred embodiment, motion control system 196 is capable of selectively placing bar engaging assembly 200 in a desired position. Motion control system 196 may comprise various elements without deviating from the spirit and scope of the present invention. For example, motion control system 196 may comprise one or more robots, one or more linear actuators, and/or one or more rotary actuators. Linear actuators which may be suitable in some applications are commercially available from Lintech Corporation of Monrovia, Calif. and Tol-o-matic Corporation of Hamel, Minn.

System 192 also includes a conveyor 220 that preferably extends through at least a portion of system 192. In some methods in accordance with the present invention, conveyor 220 may be utilized to transport material from system 192 to a desired location. In the embodiment of FIG. 11, conveyor 220 includes a belt 222 and a plurality of rollers 224. Bar engaging assembly 200 and motion control system 196 may be used to retrieve bars and place them on belt 222 of conveyor 220.

Figure 12:
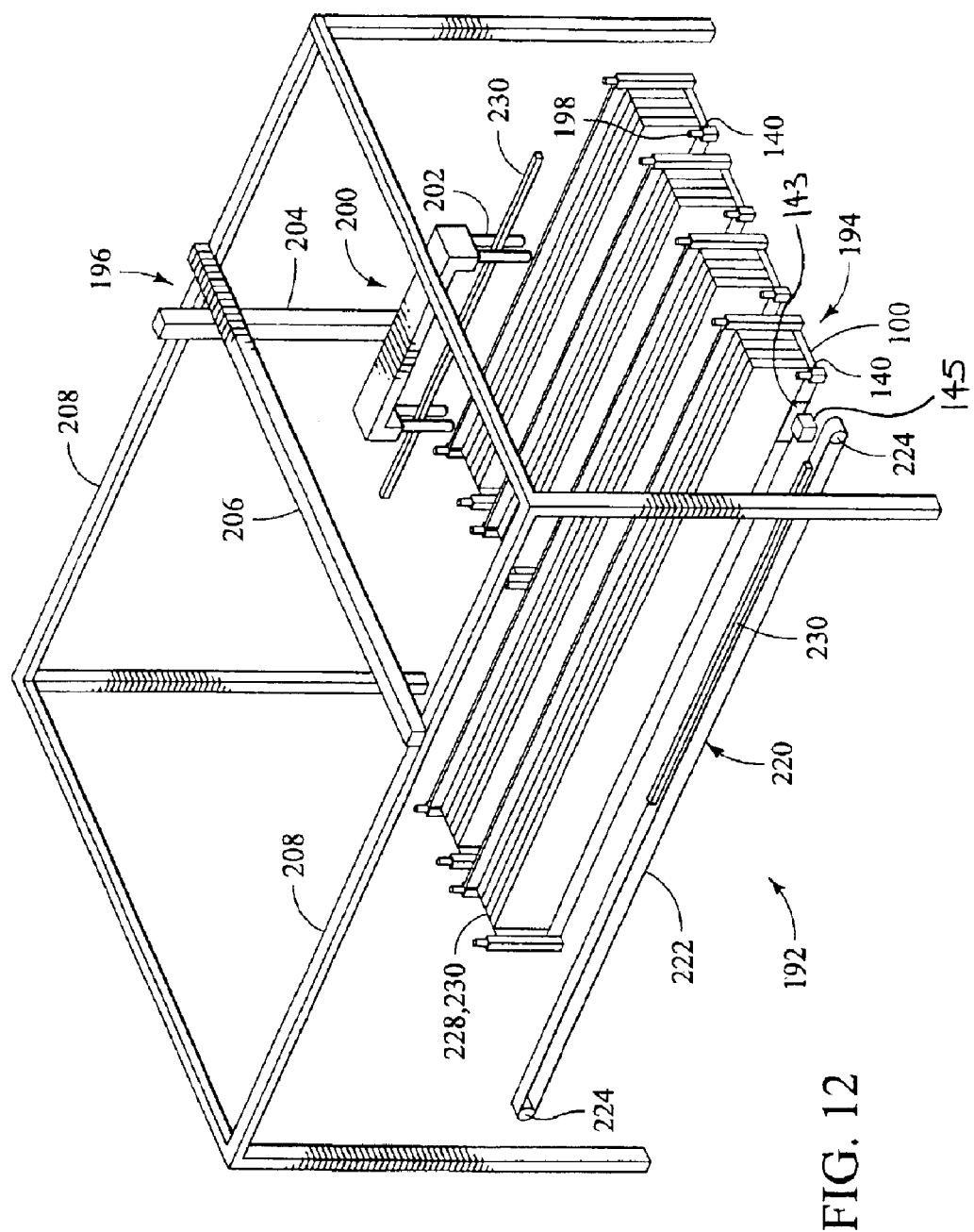
FIG. 12 is an additional perspective view a system of FIG. 11.

FIG. 12 is an additional perspective view of system 192 of FIG. 11. In the embodiment of FIG. 12, a container 100 has been positioned in each bay 194. For purposes of illustration, a portion of each container 100 is cut-away to reveal an alignment pin 198. Thus, in FIG. 12, it may be appreciated that each container 100 includes a plurality of sockets 140 that are dimensioned to receive an alignment pin 198. In some methods in accordance with the present invention, alignment pins 198 may be used to locate containers 100 relative to system 192.

In FIG. 12 a sensor target 143 is shown fixed to one container 100. In the embodiment of FIG. 12, sensor target 143 is disposed in alignment with sensor 145 when container 100 is correctly oriented in a bay 194. In a preferred embodiment, sensor 145 is adapted to detect the presence of sensor target 143. Sensor 145 may comprise various sensors without deviating from the spirit and scope of the present invention. For example, sensor 145 may comprise an arm that mechanically contacts sensor target 143 and trips a switch. By way of another example, sensor 145 may be an optical sensor which generates a beam that is broken and/or reflected by sensor target 145. By way of yet another example, sensor 145 may sense the presence of sensor target using a change in inductance or capacitance.

In the embodiment of FIG. 12, each container 100 holds a plurality of bar stock stacks 228 which are illustrated somewhat diagramatically in FIG. 12. In some embodiments, each stack 228 comprises a plurality of bars 230 arranged one on top of the other. One bar 230 shown held by bar engaging members 202 of bar engaging assembly 200. Bar engaging assembly 200 and motion control system 196 may be used to select a container 100 containing a plurality of desired bars, remove a desired bar, and place the desired bar on belt 222 of conveyor 220. In FIG. 12, one bar 230 can be seen resting on belt 222 of conveyor 220.

Figure 13:
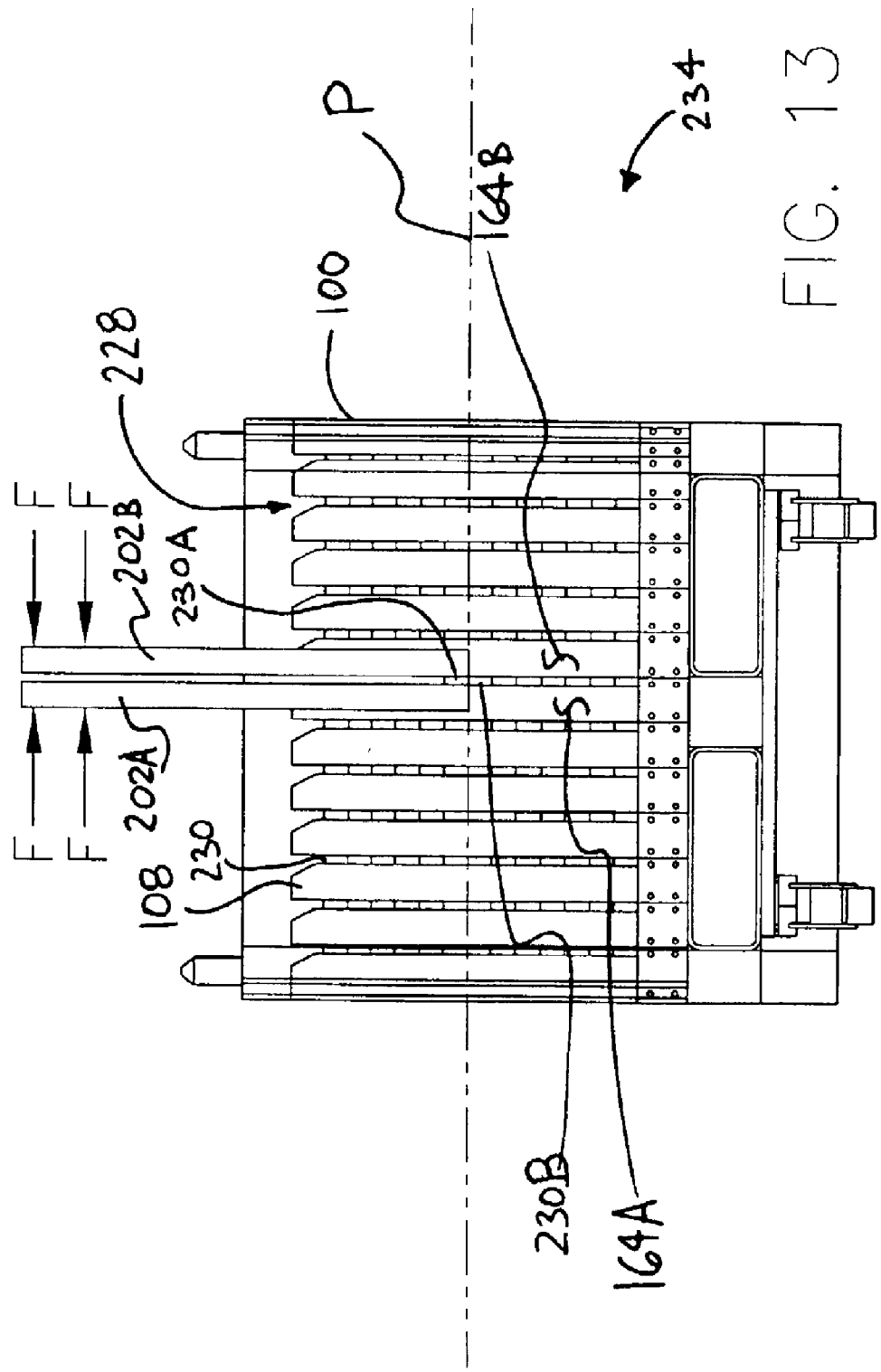
FIG. 13 is a cross sectional view of a container assembly in accordance with the present invention.

FIG. 13 is a cross sectional view of a container assembly 234 in accordance with the present invention. Container assembly 234 includes a container 100 having a plurality of bar locating members 108. A plurality of bars 230 are disposed between adjacent bar locating members 108 to form stacks 228. In FIG. 13, a first bar engaging member 202A can be seen disposed within a first space 164A defined by a plurality of bars 230. A second bar engaging member 202B is disposed in a second space 164B defined by a plurality of bars 230.

In the embodiment of FIG. 13, first bar engaging member 202A and second bar engaging member 202B have been urged towards one another, and a top bar 230A has been captured between first bar engaging member 202A and second bar engaging member 202B. In FIG. 13, it may be appreciated that first bar engaging member 202A and second bar engaging member 202B are both disposed above a plane P defined by the top surface of a second bar 230B.

Figure 14:
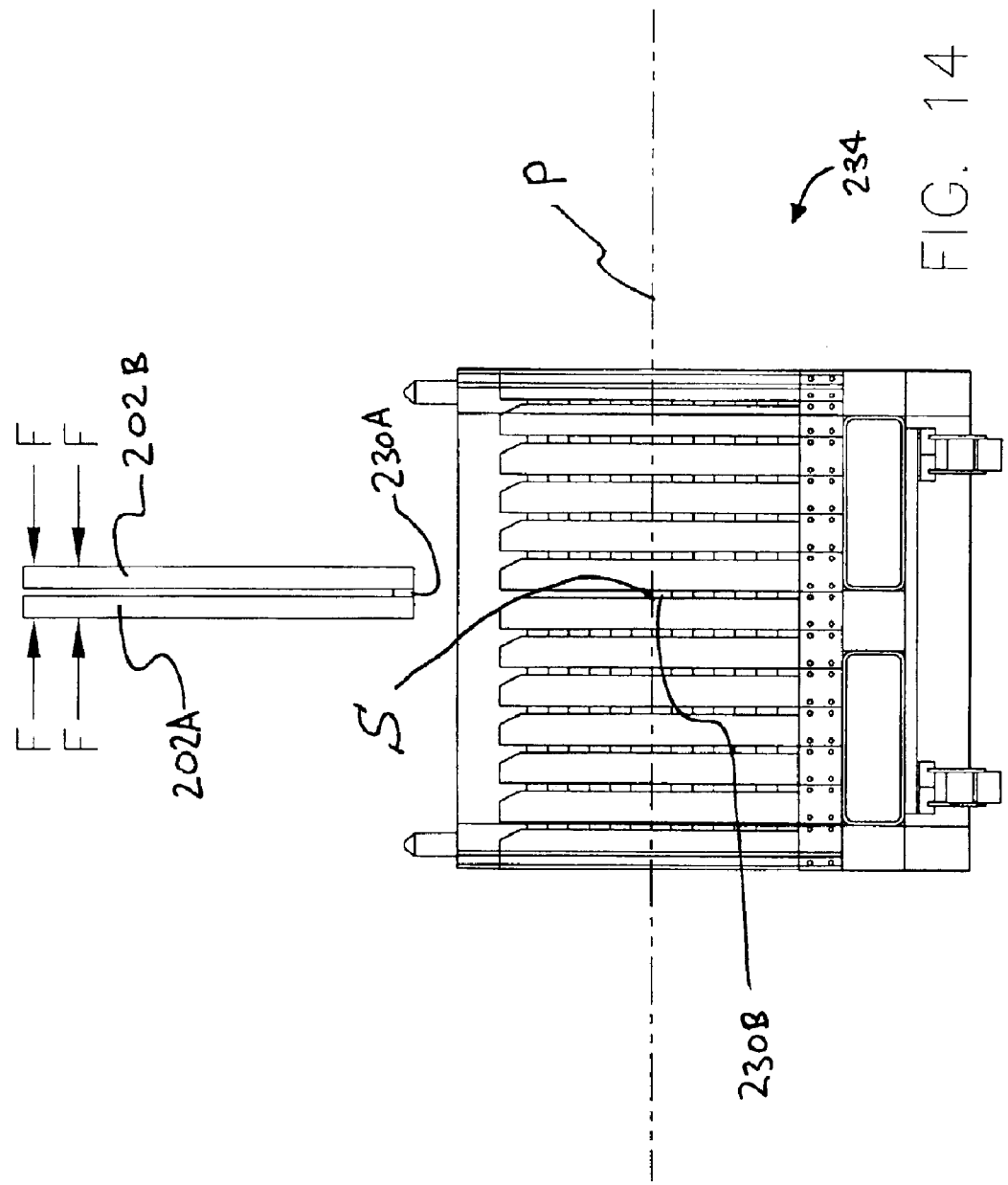
FIG. 14 is an additional cross sectional view of the container assembly of FIG. 13.

FIG. 14 is an additional cross sectional view of the container assembly 234 of FIG. 13. In the embodiment of FIG. 14, first bar engaging member 202A and second bar engaging member 202B have been moved to a new position, for example, using motion control system 196.

In FIG. 14, it may be appreciated that top bar 230A has been removed from container 100 by first bar engaging member 202A and second bar engaging member 202B. In some methods in accordance with the present invention, top bar 230A may be removed from container 100 by moving top bar 230A in a direction that is generally perpendicular to a top surface S of second bar 230B. In FIG. 14, it may be appreciated that plane P is defined by top surface S of second bar 230B. Plane P is illustrated with a phantom line in FIG. 14.

Figure 15:
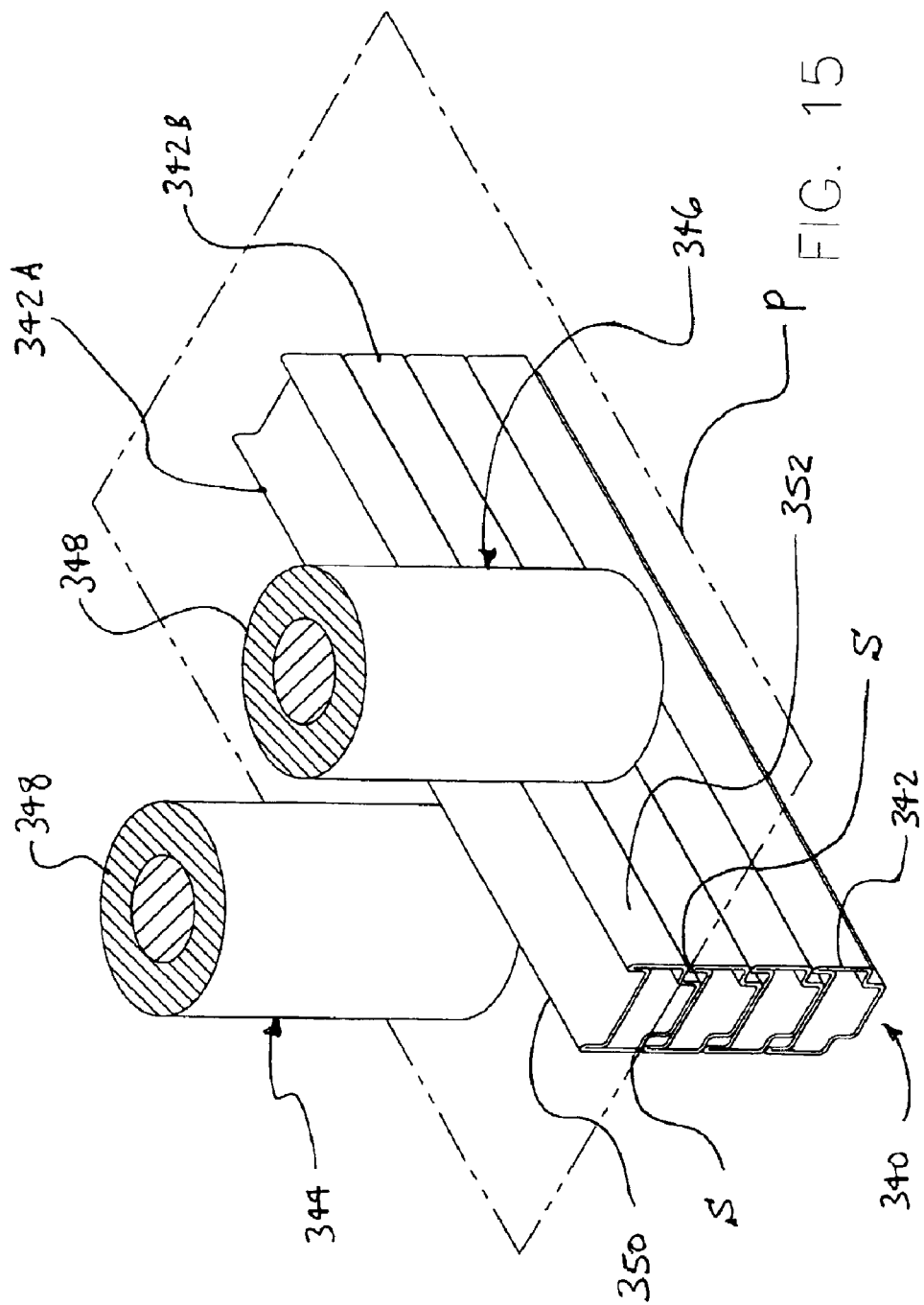
FIG. 15 is a perspective view of an additional exemplary embodiment of the present invention.

FIG. 15 is a perspective view of an additional exemplary embodiment of the present invention. A stack 340 comprising a plurality of bars 342 is shown in FIG. 15. Stack 340 includes a top bar 342A and a second bar 342B. In FIG. 15, a first finger 344 and a second finger 346 are positioned proximate top bar 342A. A finger sleeve 348 of first finger 344 is shown contacting a first side 350 of top bar 342A and a finger sleeve 348 of second finger 346 is shown contacting a second side 352 of top bar 342A. In FIG. 15 it may be appreciated that first finger 344 and second finger 346 are both positioned above a plane P defined by a top surfaces S of second bar 342B. In some methods in accordance with the present invention, first finger 344 and a second finger 346 may be used to lift top bar 342A from stack 340.

Figure 16:
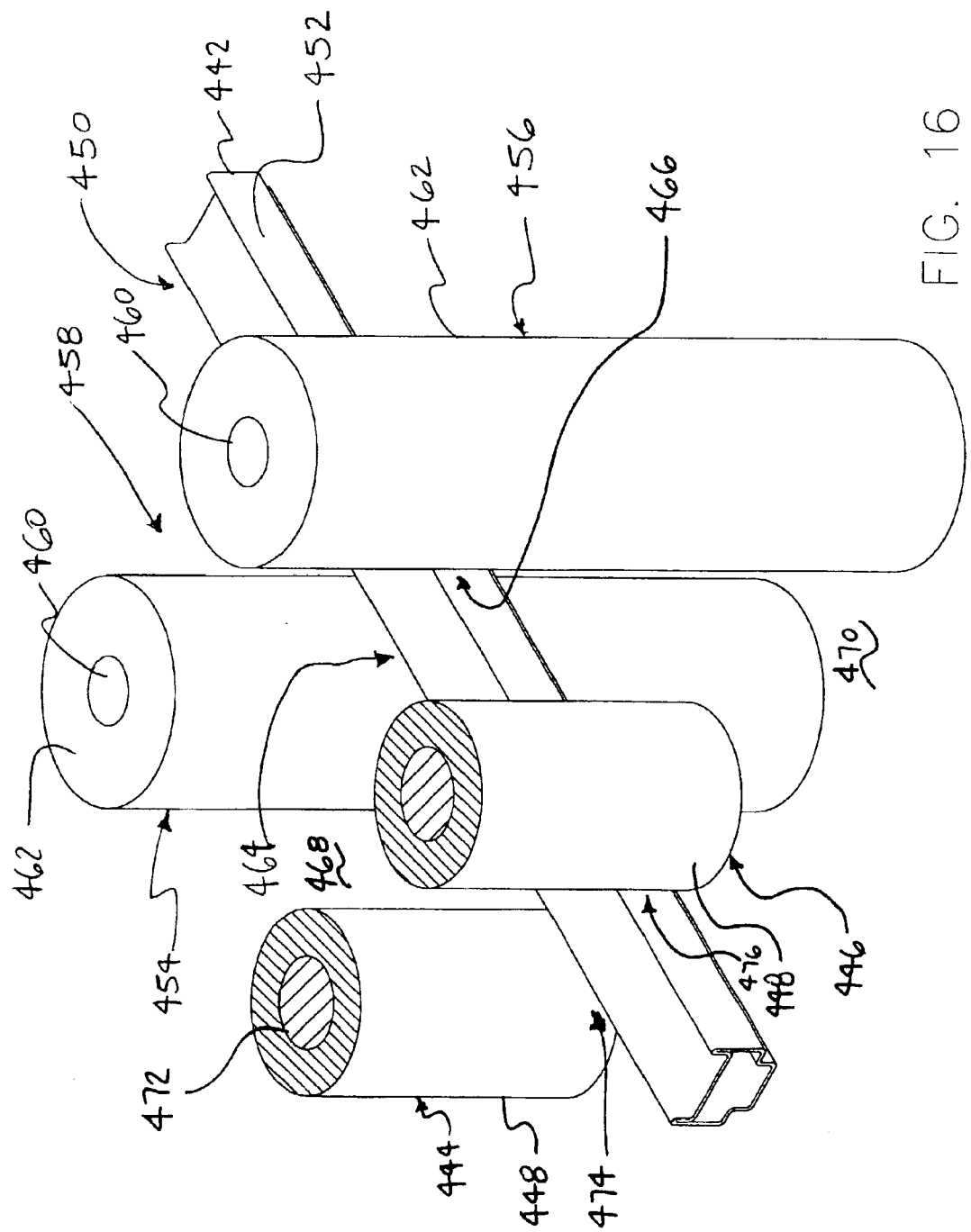
FIG. 16 is a perspective view of yet another exemplary embodiment of the present invention.

FIG. 16 is a perspective view of yet another exemplary embodiment of the present invention. In FIG. 16, a first tine 454 and a second tine 456 are laterally spaced from one another so that first tine 454 and second tine 456 define a channel 458. In the embodiment of FIG. 16, a bar 442 is disposed within channel 458. First tine 454 comprises a tine shaft 460 and a tine sleeve 462 disposed about tine shaft 460. Second tine 456 also comprises a tine sleeve 462 disposed about a tine shaft 460. In FIG. 16, tine sleeve 462 of first tine 454 is shown contacting a first side 450 of bar 442 at a first tine interface 464. Also in FIG. 16, tine sleeve 462 of second tine 456 is shown contacting a second side 452 of bar 442 at a second tine interface 466.

In the embodiment of FIG. 16, a first finger 444 is disposed within a first space 468 defined in part by first tine 454. Also in the embodiment of FIG. 16, a second finger 446 is disposed within a second space 470 defined in part by second tine 456. First finger 444 comprises a finger shaft 472 and a finger sleeve 448 disposed about finger shaft 472. Second finger 446 also comprises a finger sleeve 448 disposed about a finger shaft 472. In FIG. 16, finger sleeve 448 of first finger 444 is shown contacting a first side 450 of bar 442 at a first finger interface 474. Also in FIG. 16, finger sleeve 448 of second finger 446 is shown contacting a second side 452 of bar 442 at a second finger interface 476. In some embodiments of the present invention, each finger interface has a finger interface coefficient of friction and each tine interface has a tine interface coefficient of friction. In certain advantageous embodiments of the present invention, the finger interface coefficient of friction is generally greater than the tine coefficient of friction. With reference to FIG. 16, it will be appreciated that because first finger 444 and second finger 446 include not laterally extending surfaces, these fingers are retaining bar 442 through frictional engagement only. When the finger interface coefficient of friction is generally greater than the tine coefficient of friction first finger 444 and second finger 446 are able to pull bar 442 out of channel 458 defined by first tine 454 and second tine 456.

Figure 17:
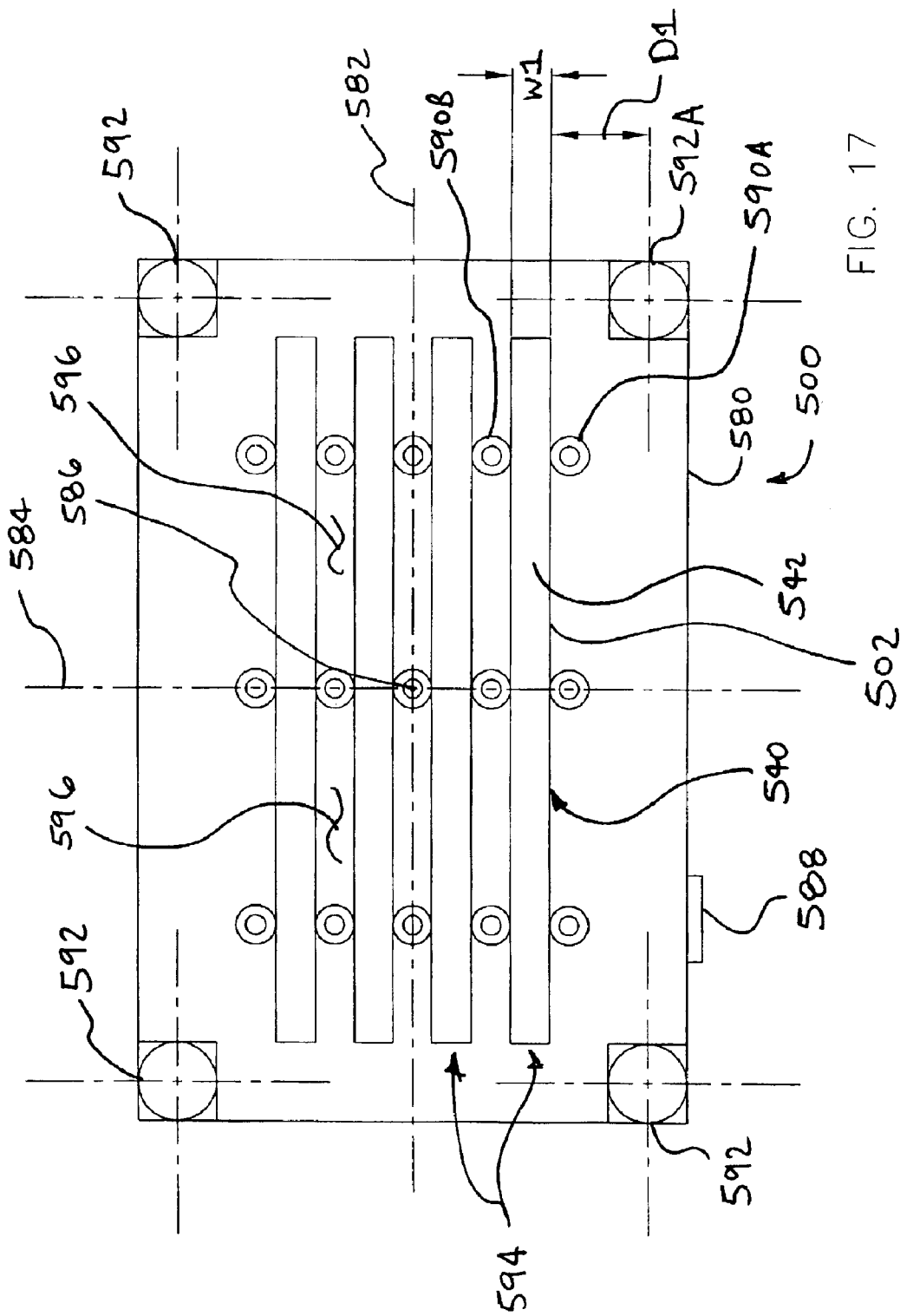
FIG. 17 is a diagrammatic view of a container in accordance with an additional exemplary embodiment of the present invention.

FIG. 17 is a diagrammatic view of a container 500 in accordance with an additional exemplary embodiment of the present invention. Container 500 includes a frame 580, a longitudinal axis 582, and a lateral axis 584. In the embodiment of FIG. 17, a centroid 586 of container 500 is located at an intersection of longitudinal axis 582 and lateral axis 584. Container 500 of FIG. 17 also includes a sensor target 588 that is selectively coupled to frame 580. In FIG. 17, it may be appreciated that sensor target 588 has an offset location relative lateral axis 584 and longitudinal axis 582. Container 500 of FIG. 17 also includes a plurality of sockets 592 which may be used to locate container 500 within a workstation. Some methods in accordance with the present invention include the step of sensing the presence of sensor target 588 to verify that container 500 is properly oriented within the workstation.

In the embodiment of FIG. 17, container 500 includes a plurality of tines 590 that are laterally spaced apart to define a plurality of channels 594. Also in the embodiment of FIG. 17, tines 590 are longitudinally spaced about to define a plurality of spaces 596. A proximal stack 540 comprising a plurality of bars 542 is disposed between a first tine 590A and second tine 590B. If FIG. 17 it may be appreciated that a proximal side 502 of proximal stack 540 is located a first distance D1 from a distal socket 592A.

In some methods in accordance with the present invention, a plurality of containers containing various types of bars are provided for use with a workstation. In some cases the various types of bars may have different widths. In the embodiment of FIG. 17, each bar 542 has a width W1. In some advantageous methods, the distance between a distal socket of each container and the proximal side of a proximal stack of bars held by the container is the same for all containers. In these advantageous methods, the proximal side of the proximal stack of bars is located in a consistent location regardless of the type of bar that is held in a particular container.

Figure 18:
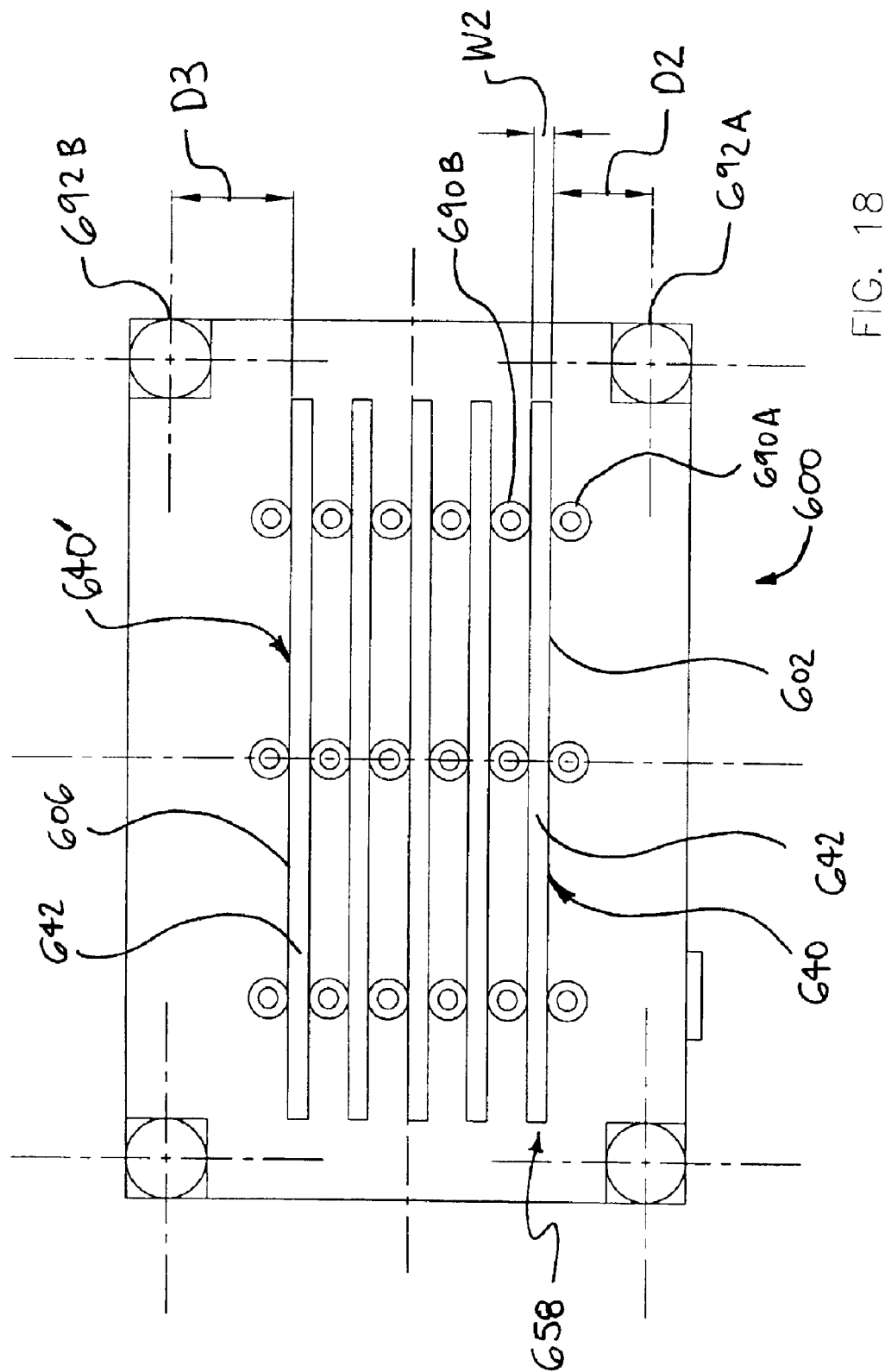
FIG. 18 is a diagrammatic view of a container in accordance with an additional exemplary embodiment of the present invention.

FIG. 18 is a diagrammatic view of a container 600 in accordance with an additional exemplary embodiment of the present invention. Container 600 includes a first tine 690A and a second tine 690B that define a channel 658. A proximal stack 640 comprising a plurality of bars 642 is disposed in channel 658 (i.e., between first tine 690A and second tine 690B). In the embodiment of FIG. 18, bars 642 of proximal stack 640 have a width W2.

In FIG. 18 it may be appreciated that a proximal side 602 of proximal stack 640 is located a distance D2 from a proximal socket 692A. In the exemplary embodiment of FIG. 18, distance D2 is substantially equal to distance D1 shown in FIG. 17. This is the case, even though width W2 shown in FIG. 18 is different than width W1 shown in FIG. 17. A distal stack 640' comprising a plurality of bars 642 is also shown if FIG. 18. A distal side 606 of distal stack 640' is located a distance D3 from a distal socket 692B. In FIG. 18, distance D3 is generally greater than distance D2.

Figure 19:
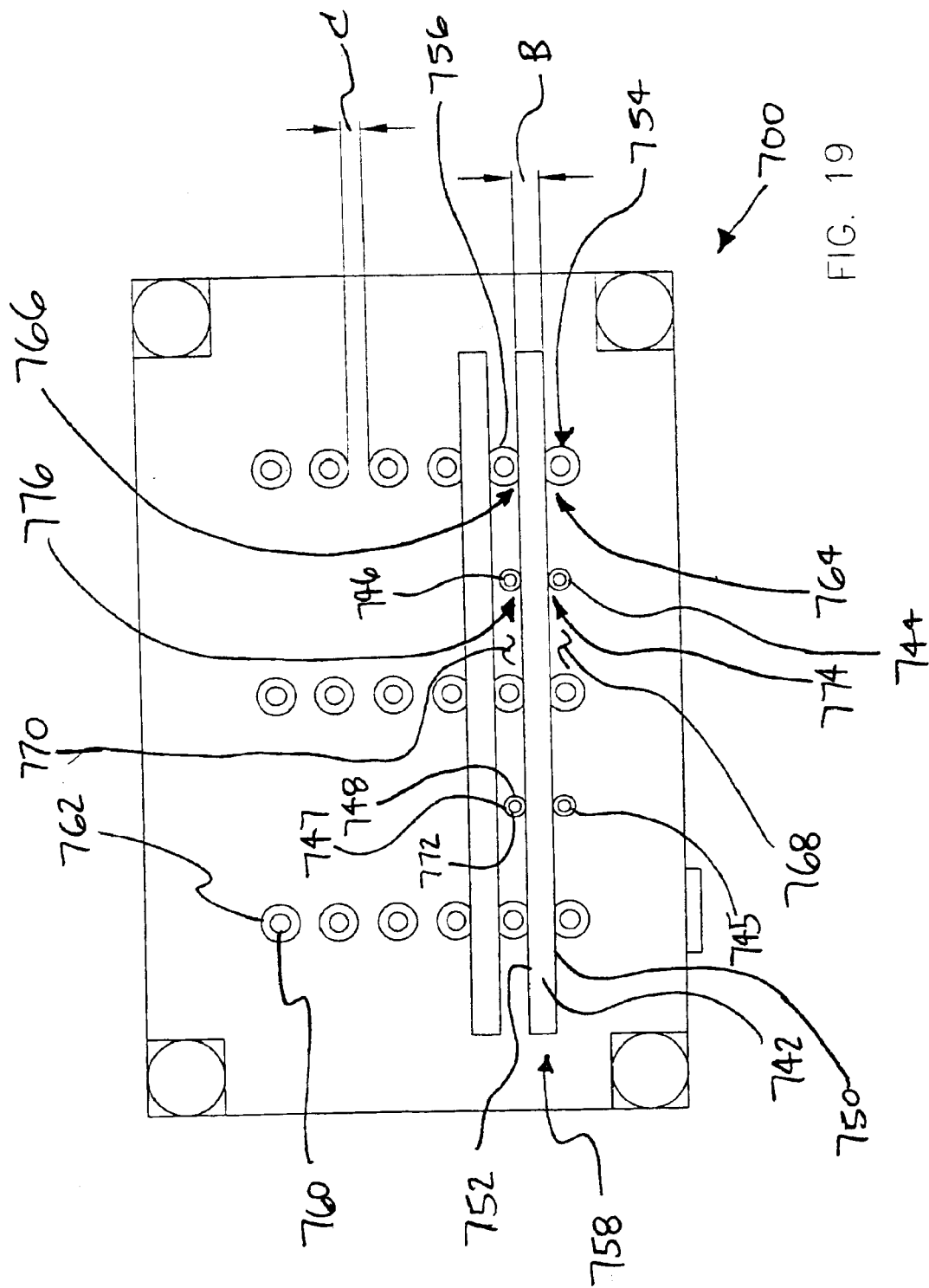
FIG. 19 is a diagrammatic view of a container in accordance with an additional exemplary embodiment of the present invention.

FIG. 19 is a diagrammatic view of a container 700 in accordance with an additional exemplary embodiment of the present invention. In FIG. 19, a first tine 754 and a second tine 756 are laterally spaced from one another so that first tine 754 and second tine 756 define a channel 758. In the embodiment of FIG. 19, a bar 742 is disposed within channel 758. In the embodiment of FIG. 19, each tine comprises a tine shaft 760 and a tine sleeve 762 disposed about the tine shaft 760. In FIG. 19, tine sleeve 762 of first tine 754 is shown contacting a first side 750 of bar 742 at a first tine interface 764. Also in FIG. 19, tine sleeve 762 of second tine 756 is shown contacting a second side 752 of bar 742 at a second tine interface 766.

In the exemplary embodiment of FIG. 19, bar 742 has width B and channel 758 has a width C when the sleeves of the tines defining channel 758 are allowed to assume a resting shape. With reference to FIG. 19, it may be appreciated that width B is generally larger than width C. In FIG. 19, it may also be appreciated that tine sleeve 762 of first tine 754 and tine sleeve 762 of second tine 756 are shown assuming a generally deformed shape.

In the embodiment of FIG. 19, a first finger 744 is disposed within a first space 768 defined in part by first tine 754. Also in the embodiment of FIG. 19, a second finger 746 is disposed within a second space 770 defined in part by second tine 756. A third finger 745 and a fourth finger 747 are also shown in FIG. 19. In the embodiment of FIG. 19, each finger comprises a finger shaft 772 and a finger sleeve 748 disposed about the finger shaft 772. In FIG. 19, finger sleeve 748 of first finger 744 is shown contacting a first side 750 of bar 742 at a first finger interface 774. Also in FIG. 19, finger sleeve 748 of second finger 746 is shown contacting a second side 752 of bar 742 at a second finger interface 776. In some embodiments of the present invention, each finger interface has a finger interface coefficient of friction and each tine interface has a tine interface coefficient of friction.

In certain advantageous embodiments of the present invention, the finger coefficient of friction is generally greater than the tine coefficient of friction.

Each tine sleeve 762 and each finger sleeve 748 may comprise various materials without deviating from the spirit and scope of the present invention. Examples of materials which may be suitable in some applications include, polymeric materials (e.g., polyethylene) and elastomeric materials (e.g., polyurethane). In some cases, each sleeve may comprise a foam material (e.g., a closed cell foam material). In some embodiments of the present invention, each finger sleeve has a first hardness and each tine sleeve has a second hardness with the first hardness being greater than the second hardness. In some embodiments of the present invention, each finger sleeve has a first durometer and each tine sleeve has a second durometer with the first durometer being greater than the second durometer. In some embodiments of the present invention, each finger sleeve has a first modulus and each tine sleeve has a second modulus with the first modulus being greater than the second modulus.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A method, comprising the steps of:
   providing a container having a plurality of tines and a sensor target;
   placing a plurality of bars between a first tine and a second tine to form a stack;
   transporting the container to a workstation;
   locating the container relative to the workstation; and
   sensing the presence of the sensor target to verify that the container is properly oriented relative to the workstation;
   wherein the step of sensing the presence of the sensor target comprises the step of illuminating a portion of the sensor target with a beam.

2. The method of claim 1, wherein the sensor target includes a piece of reflective material and the step of sensing the presence of the sensor target includes the step of directing a beam at the sensor target so that the beam is reflected off of the reflective material.

3. The method of claim 1, wherein the beam comprises infra-red light.

4. The method of claim 1, wherein the step of locating the container relative to the workstation includes the step of inserting a plurality of pins into a plurality of sockets.

5. The method of claim 1, further including the steps of:
   removing the container from the workstation;
   locating a second container relative to the workstation in the position formerly occupied by the container;
   the second container including a second stack of second bars;
   wherein a side of the second stack is located in substantially the same location previously occupied by a side of the stack of the container.

6. The method of claim 5, wherein the second bars are different from the bars.

7. The method of claim 6, wherein the bars have a first width, the second bars have a second width, and the second width is different from the first width.

8. The method of claim 5, wherein the sensor target of the container is located a first longitudinal distance from a centroid of the container and a second sensor target of the second container is located a second longitudinal distance from a centroid of the second container so that a difference between the location of the sensor target and the location of the second sensor target indicates a difference between the contents of the container and the contents of the second container.

9. The method of claim 1, further including the step of removing a top bar from the stack.

10. The method of claim 9, wherein the step of removing the top bar from the stack comprises the step of moving the top bar in a direction that is generally perpendicular to a top surface of a second bar of the stack of bars.

11. The method of claim 9, wherein the step of removing the top bar from the stack includes the step of positioning a first finger above a plane defined by a top surface of a second bar of the stack.

12. The method of claim 9, wherein the step of removing the top bar from the stack includes the steps of frictionally engaging a first side of the top bar with a first finger and frictionally engaging a second side of the top bar with a second finger.

13. A method comprising the steps of:
    providing a stack of bars disposed between a first tine and a second tine;
    inserting a first finger into a first space defined in part by the first tine;
    inserting a second finger into a second space defined in part by the second tine;
    contacting a first side of a top bar with the first finger;
    contacting a second side of the ton bar with the second finger;
    removing the top bar from the stack;
    wherein a first finger sleeve is disposed about the first sleeve, a second finger sleeve is disposed about the second sleeve; and
    wherein the first finger sleeve and the second finger sleeve comprise a polymeric material.

14. The method of claim 13, wherein the step of removing the top bar from the stack comprises the step of moving the top bar in a direction that is generally perpendicular to a top surface of a second bar of the stack of bars.

15. The method of claim 13, wherein the step of inserting a first finger into the first space includes the step of positioning the first finger above a plane defined by a top surface of a second bar of the stack.

16. The container of claim 13, wherein the polymeric material comprises polyethylene.

17. The container of claim 13, wherein the first finger sleeve and the second finger sleeve comprise an elastomeric material.

18. The container of claim 17, wherein the elastomeric material comprises polyurethane.

19. The container of claim 13, wherein the first finger sleeve and the second finger sleeve comprise a foam material.

20. The container of claim 19, wherein the foam material comprises a closed cell foam material.

21. A method comprising the steps of:
    providing a stack of bars disposed between a first tine and a second tine;
    inserting a first finger into a first space defined in part by the first tine;

inserting a second finger into a second space defined in part by the second tine;

contacting a first side of a top bar with the first finger;

contacting a second side of the ton bar with the second finger;

removing the top bar from the stack;

wherein:

the first finger includes a finger sleeve contacting the first side of the top bar at a first interface having a first coefficient of friction;

the second tine includes a tine sleeve contacting the second side of the top bar at a second interface having a second coefficient of friction;

the second coefficient of friction being smaller than the first coefficient of friction.

22. The method of claim 21, wherein the finger sleeve has a first hardness;

the tine sleeve has a second hardness; and the first hardness is greater than the second hardness.

23. The method of claim 21, wherein the finger sleeve has a first durometer;

the tine sleeve has a second durometer; and the first durometer is greater than the second durometer.

24. The method of claim 21, wherein the finger sleeve has a first modulus;

the tine sleeve has a second modulus; and the first modulus is greater than the second modulus.

25. The container of claim 21, wherein the finger sleeve is softer than a painted surface of the top bar; and the finger sleeve is harder than the tine sleeve.

* * * * *